(12) United States Patent
Cheadle et al.

(10) Patent No.: US 11,938,782 B2
(45) Date of Patent: Mar. 26, 2024

(54) HEAT EXCHANGER WITH INTEGRATED ELECTRICAL HEATING ELEMENT

(71) Applicant: Dana Canada Corporation, Oakville (CA)

(72) Inventors: Brian E. Cheadle, Brampton (CA); Michael J. R. Bardeleben, Oakville (CA); Jeffrey O. Sheppard, Milton (CA); Benjamin A. Kenney, Oakville (CA)

(73) Assignee: DANA CANADA CORPORATION, Oakville (CA)

( * ) Notice: Subject to any disclaimer, the term of this patent is extended or adjusted under 35 U.S.C. 154(b) by 842 days.

(21) Appl. No.: 16/977,796

(22) PCT Filed: Mar. 7, 2019

(86) PCT No.: PCT/CA2019/050283
§ 371 (c)(1),
(2) Date: Sep. 2, 2020

(87) PCT Pub. No.: WO2019/169502
PCT Pub. Date: Sep. 12, 2019

(65) Prior Publication Data
US 2020/0398634 A1 Dec. 24, 2020

Related U.S. Application Data

(60) Provisional application No. 62/639,560, filed on Mar. 7, 2018.

(51) Int. Cl.
*B60H 1/00* (2006.01)
*F24H 1/10* (2022.01)
*F28F 3/12* (2006.01)

(52) U.S. Cl.
CPC ......... *B60H 1/00278* (2013.01); *F24H 1/105* (2013.01); *F28F 3/12* (2013.01)

(58) Field of Classification Search
CPC . F24H 1/009; F24H 1/10; F24H 1/105; F24H 1/121; F24H 1/124; F24H 9/18;
(Continued)

(56) References Cited

U.S. PATENT DOCUMENTS

RE25,890 E    10/1965  McCammon
6,723,183 B2   4/2004  Oda et al.
(Continued)

FOREIGN PATENT DOCUMENTS

CA          2260890 A1      8/2000
KR      2019-0095746 A  *   8/2019
(Continued)

OTHER PUBLICATIONS

ISA Canadian Intellectual Property Office, International Search Report and Written Opinion Issued in Application No. PCT/CA2019/050283, dated Jun. 6, 2019, WIPO, 9 pages.

*Primary Examiner* — Hung D Nguyen
(74) *Attorney, Agent, or Firm* — McCoy Russell LLP

(57) ABSTRACT

A heat exchanger has a fluid flow passage having an inlet and an outlet, and with a first plate and a second plate in opposed facing relation to one another. The fluid flow passage is defined by a space between the inner surfaces of the first and second plates. An electrical heating element is outside the fluid flow passage and adjacent to the outer surface of the first plate, such that heat produced by the electrical heating element is transferred through the first plate to the fluid in the fluid flow passage during use of the heat exchanger. In an embodiment, the first plate has an opening to receive a heater plate component including a first plate portion having an inner surface bonded to a turbulence-enhancing insert and an outer surface bonded to the electrical heating element.

18 Claims, 19 Drawing Sheets

(58) Field of Classification Search
CPC .......... F24H 9/1818; F24H 9/2078; H05B 2203/013; H05B 2203/021; H05B 2203/023; H05B 3/06; H05B 3/26; H05B 3/262; H05B 3/28; H05B 3/48; H05B 3/50; B60H 1/00278; B60H 1/034; B60H 1/2221; B60H 1/2225; F28F 3/025; F28F 3/027; F28F 3/04; F28F 3/042; F28F 3/044; F28F 3/046; F28F 3/06; F28F 3/08; F28F 3/083; F28F 3/10; F28F 3/12
See application file for complete search history.

(56) References Cited

U.S. PATENT DOCUMENTS

| | | | |
|---|---|---|---|
| 6,863,122 B2 * | 3/2005 | St. Pierre | F28F 3/044 |
| | | | 165/167 |
| 8,453,770 B2 | 6/2013 | Tang | |
| 8,653,423 B2 | 2/2014 | Olding et al. | |
| 9,499,049 B2 | 11/2016 | Boot et al. | |
| 10,220,726 B2 | 3/2019 | Zing et al. | |
| 2009/0152030 A1 | 6/2009 | Palatov | |
| 2016/0359211 A1 * | 12/2016 | Kenney | H01M 10/6557 |
| 2018/0281776 A1 | 10/2018 | Pandit et al. | |
| 2019/0039592 A1 | 2/2019 | Simonini et al. | |
| 2019/0061504 A1 | 2/2019 | Bassis | |

FOREIGN PATENT DOCUMENTS

| | | | | |
|---|---|---|---|---|
| WO | 2015113161 A1 | 8/2015 | | |
| WO | 2016095804 A1 | 6/2016 | | |
| WO | WO-2016095804 A1 * | 6/2016 | | F24H 1/10 |

\* cited by examiner

HEAT EXCHANGER WITH INTEGRATED ELECTRICAL HEATING ELEMENT

CROSS-REFERENCE TO RELATED APPLICATION

The present application is a U.S. National Phase of International Patent Application Serial No. PCT/CA2019/050283 entitled "HEAT EXCHANGER WITH INTEGRATED ELECTRICAL HEATING ELEMENT," filed on Mar. 7, 2019. International Patent Application Serial No. PCT/CA2019/050283 claims priority to U.S. Provisional Patent Application No. 62/639,560 filed Mar. 7, 2018. The entire contents of each of the above-mentioned applications are hereby incorporated by reference in their entirety for all purposes.

TECHNICAL FIELD

The present disclosure relates to a heat exchanger for a vehicle, such as a battery electric vehicle (BEV) or hybrid electric vehicle (HEV), wherein an electrical heating element is integrated with the heat exchanger, and to systems for heating and cooling one or more vehicle components using such heat exchangers. The heat exchanger has a fluid flow passage for circulation of a fluid, and the electrical heating element is mounted on an outer surface of the fluid flow passage for heating the fluid inside the fluid flow passage under certain conditions of operation.

BACKGROUND

A key limitation of lithium-ion battery systems, such as those used in BEVs and HEVs, is that the battery cannot be reliably operated or charged at temperatures much below 0° C., and especially below −5° C. Ideally the battery should be brought to a temperature of about 5-20° C. as quickly as possible from a cold start. Until it reaches this temperature, the battery has limited power capacity, and the battery can be damaged by attempting to charge or discharge it at temperatures below this range.

Because waste heat from an internal combustion engine is not available in BEVs, and is of limited availability in HEVs, alternate heat sources are necessary or at least desirable for efficient battery charging and operation in these vehicles.

Waste heat from an internal combustion engine is also a typical heat source for passenger cabin heating and for active warm-up (AWU) systems which quickly bring automotive fluids to optimal operating temperatures at start-up, in particular at cold start-up conditions. Alternate heat sources for these functions are also necessary or desirable in BEVs and HEVs.

In order to save space and minimize cost, it is generally desirable to integrate components of the vehicle heating/cooling system wherever possible. For example, although it is known to integrate a heating element into a fluid heating device, there are a number of technical problems which have limited the effective integration of surface film heating technology with fluid heating devices for vehicular applications.

It is desirable to provide heat exchangers with heating and cooling capacity to mitigate one or more of the above problems, and systems for heating and cooling one or more vehicle components using such heat exchangers.

SUMMARY

In accordance with an aspect of the present disclosure, there is provided a heat exchanger comprising a fluid flow passage adapted for flow of a fluid, the fluid flow passage having an inlet and an outlet.

According to an aspect, the heat exchanger comprises a first plate and a second plate in opposed facing relation to one another, wherein each of the first and second plates is thermally conductive, has an inner surface facing inwardly toward the fluid flow passage and an outer surface facing outwardly from the fluid flow passage, wherein the fluid flow passage is defined by a space between the inner surfaces of the first and second plates.

According to an aspect, the first and second plates are comprised of aluminum.

According to an aspect, the heat exchanger further comprises a first electrical heating element located outside the fluid flow passage and adjacent to the outer surface of the first plate, such that heat produced by the first electrical heating element is transferred through the first plate to the fluid in the fluid flow passage during use of the heat exchanger.

According to an aspect, the first electrical heating element has a thickness from about 1 μm to about 1000 μm.

According to an aspect, the first electrical heating element comprises an electrically insulating dielectric base layer which is closest to the outer surface of the first plate, and an electrically resistive heater layer on the dielectric layer.

According to an aspect, the dielectric base layer comprises a thermally conductive, electrically insulating composite layer comprising a polymer mixed with a particulate filler material.

According to an aspect, the dielectric base layer is in direct contact with and thermally bonded directly to the outer surface of the first plate.

According to an aspect, at least one of the first plate and the second plate comprises a shaped plate having a generally flat, planar base surrounded on all sides by a raised peripheral sidewall extending from the base to a planar flange defining a sealing surface along which the planar flange is sealingly secured to the opposing one of the first and second plates.

According to an aspect, the first plate is substantially completely flat and the second plate comprises a shaped plate.

According to an aspect, the first electrical heating element further comprises an electrically conductive layer in direct contact with the resistive heater layer.

According to an aspect, the conductive layer comprises one or more conductive strips or buss bars which are adapted to be connected to an electrical power supply.

According to an aspect, the first electrical heating element further comprises an electrically insulating dielectric top layer provided on the resistive heater layer.

According to an aspect, the heat exchanger further comprises a turbulence-enhancing insert comprising a corrugated fin or a turbulizer having ridges connected by side walls, wherein a first plurality of ridges is in contact with the inner surface of the first plate, and wherein the first plurality of ridges is in intimate thermal contact with the inner surface of the first plate.

According to an aspect, the turbulence-enhancing insert further comprises a second plurality of ridges which is in contact with the inner surface of the second plate but is not metallurgically bonded thereto, so as to provide a thermal conductance gap therebetween.

According to an aspect, the heat exchanger further comprises a second electrical heating element provided outside the fluid flow passage and located adjacent to the outer surface of the second plate, such that heat produced by the second electrical heating element is transferred through the second plate to the fluid in the fluid flow passage during use of the heat exchanger.

According to an aspect, the second electrical heating element has a thickness from about 1 µm to about 1000 µm.

According to an aspect, the second electrical heating element comprises an electrically insulating dielectric base layer which is closest to the outer surface of the second plate, and an electrically resistive heater layer on the dielectric layer.

According to an aspect, the dielectric base layer comprises a thermally conductive, electrically insulating composite layer comprising a polymer mixed with a particulate filler material.

According to an aspect, the heat exchanger further comprises a heat sink plate having an inner surface which is fixed to the outer surface of the first plate by a metallurgical bond, and an outer surface to which the first electrical heating element is directly applied with the dielectric base layer of the first electrical heating element in direct contact with and thermally bonded directly to the outer surface of the heat sink plate.

According to an aspect, the heat sink plate is thicker than either of the first plate and the second plate.

According to an aspect, the second plate comprises a shaped plate having a generally flat, planar base surrounded on all sides by a raised peripheral sidewall extending from the base to a planar flange defining a sealing surface along which the raised peripheral flange is sealingly secured to the opposing one of the first and second plates.

According to an aspect, the second plate has a plurality of protrusions formed in the flat, planar base thereof, the protrusions having a height which is the same as a height of the planar flange, each protrusion having a sealing surface which is co-planar with the planar sealing surface of the planar flange.

According to an aspect, the sealing surfaces of the protrusions are in intimate thermal contact with the inner surface of the first plate.

According to an aspect, the protrusions comprise ribs and/or dimples.

According to an aspect, the outer surface of the first plate is substantially flat.

According to an aspect, the first electrical heating element is in direct contact with a substantially flat portion of the outer surface of the first plate; the electric heating element is adapted for contact with and support of a vehicle component; and the vehicle component comprises at least one battery cell and/or battery module of a rechargeable vehicle battery.

According to an aspect, the outer surface of the second plate is substantially flat; the outer surface of the second plate is adapted for contact with and support of a vehicle component; and the vehicle component comprises at least one battery cell and/or battery module of a rechargeable vehicle battery.

According to an aspect, the first plate has an opening into which a heater plate component is sealingly received.

According to an aspect, the heater plate component comprises a first plate portion having an inner surface and an outer surface; a turbulence-enhancing insert comprising a corrugated fin or a turbulizer having ridges connected by side walls, wherein a first plurality of ridges is in intimate thermal contact with the inner surface of the first plate portion; and the first electrical heating element, being in direct contact with and adhered to the outer surface of the first plate portion, and being directly opposed to the turbulence-enhancing insert.

According to an aspect, the first plate portion has a peripheral edge flange extending outwardly beyond edges of the turbulence-enhancing insert along its inner surface, and extending outwardly beyond edges of the electrical heating element along its outer surface.

According to an aspect, the peripheral edge flange of the first plate portion is connected to the first plate with a fluid-tight, sealed connection, and such that the opening in the first plate is sealed by the peripheral edge flange of the first plate portion.

According to an aspect, the heater plate component further comprises a flat support plate which is secured to the second plurality of ridges of the turbulence-enhancing insert.

According to an aspect, the flat support plate is in contact with the inner surface of the second plate.

According to an aspect, the second plate has an opening which is aligned with the opening in the first plate.

According to an aspect, the heater plate component further comprises a second plate portion having an inner surface and an outer surface, wherein the turbulence-enhancing insert is sandwiched between the first plate portion and the second plate portion, with the second plurality of ridges in intimate thermal contact with the inner surface of the second plate portion.

According to an aspect, the second plate portion has a peripheral edge flange extending outwardly beyond edges of the turbulence-enhancing insert along its inner surface.

According to an aspect, the peripheral edge flange of the second plate portion is connected to the second plate with a fluid-tight, sealed connection, and such that the opening in the second plate is sealed by the peripheral edge flange of the second plate portion.

According to an aspect, the heat exchanger further comprises a second electrical heating element provided outside the fluid flow passage, being in direct contact with and adhered to the outer surface of the second plate portion, and being directly opposed to the turbulence-enhancing insert.

According to an aspect, the heat exchanger further comprises a core comprising a plurality heat exchanger core plates and defining a plurality of first fluid flow passages and a plurality of second fluid flow passages, arranged in alternating order throughout the core.

According to an aspect, the core includes a first fluid inlet manifold and a first fluid outlet manifold in flow communication with the plurality of first fluid flow passages and a second fluid inlet manifold and a second fluid outlet manifold in flow communication with the plurality of second fluid flow passages; wherein the first plate of the heat exchanger includes the inlet and outlet of the fluid flow passage, and wherein the second plate of the heat exchanger is provided with a first fluid inlet manifold opening which is in flow communication with the first fluid inlet manifold and a first fluid outlet manifold opening which is in flow communication with the first fluid outlet manifold.

According to an aspect, the heat exchanger further comprises a thermal bypass valve arranged to selectively: permit flow of the first fluid from the inlet to the fluid flow passage, while blocking flow of the first fluid from the inlet to the first fluid inlet manifold; and at least partly block flow of the first fluid from the inlet to the fluid flow passage, while permitting flow of the first fluid from the inlet to the first fluid inlet manifold.

According to an aspect, the heat exchanger comprises a fluid heater for indirect heating of one or more vehicle components which are remote from heat exchanger.

According to an aspect, at least one of the first electrical heating element and the second electrical heating element has a flat outer surface adapted for thermal contact with one or more vehicle components, for direct heating of the one or more vehicle components.

According to an aspect, the flat outer surface of at least one of the first electrical heating element and the second electrical heating element is adapted to support the one or more vehicle components.

According to an aspect, the one or more vehicle components comprise one or more battery cells or battery modules of a rechargeable lithium-ion battery for a vehicle.

According to an aspect, each of the first and second electrical heating elements further comprises an electrically insulating dielectric top layer which defines the flat outer surface of the electrical heating element.

In accordance with another aspect of the present disclosure, there is provided a heating/cooling system for a BEV or HEV. The system may comprise one or more heating/cooling loops, wherein each cooling loop comprises a vehicle component, a heat exchanger as defined herein for at least heating and optionally cooling the vehicle component, a fluid flow conduit, and a circulation pump.

According to an aspect, the heating/cooling system may comprise first and second heating/cooling loops. For example, the first heating/cooling loop may comprise a first vehicle component comprising a rechargeable battery for powering an electric drive motor of the vehicle, and a first heat exchanger as defined herein. In this regard, the first heat exchanger may include at least one electrical heating element as defined herein, one or more first fluid flow passages for a first heat transfer fluid circulating through the first heating/cooling loop, and a first inlet and a first outlet for the one or more first fluid flow passages. The first loop may also include a second heat exchanger for cooling the first heat transfer fluid; a first circulation pump for circulating the first heat transfer fluid through the first heating/cooling loop; and a first conduit for circulating the first heat transfer fluid throughout the first heating/cooling loop.

The second heating/cooling loop of the heating/cooling system defined herein may comprise a second vehicle component comprising one or more heat-generating electronic components of the HEV/BEV. The second loop may also include the first heat exchanger of the first loop. According to this arrangement, the first heat exchanger may further include one or more second fluid flow passages for a second heat transfer fluid circulating through the second heating/cooling loop, and a second inlet and a second outlet for the one or more second fluid flow passages. According to this arrangement, the first and second fluid flow passages may be arranged to permit heat transfer between the first and second heat transfer fluids, and to provide heating of the first and second heat transfer fluids by the at least one electrical heating element.

The second heating/cooling loop of the heating/cooling system defined herein may also comprise a third heat exchanger for cooling the second heat transfer fluid circulating through the second loop; a second circulation pump for circulating the second heat transfer fluid through the second loop; and a second conduit for circulating the second heat transfer fluid throughout the second loop.

According to an aspect, the second heat exchanger of the heating/cooling system defined herein may comprise a heat exchanger in an air conditioning system of the vehicle, and/or the third heat exchanger may comprise a radiator.

BRIEF DESCRIPTION OF THE DRAWINGS

Exemplary embodiments of the present disclosure will now be described, by way of example, with reference to the accompanying drawings, in which.

DETAILED DESCRIPTION

Figure 1:
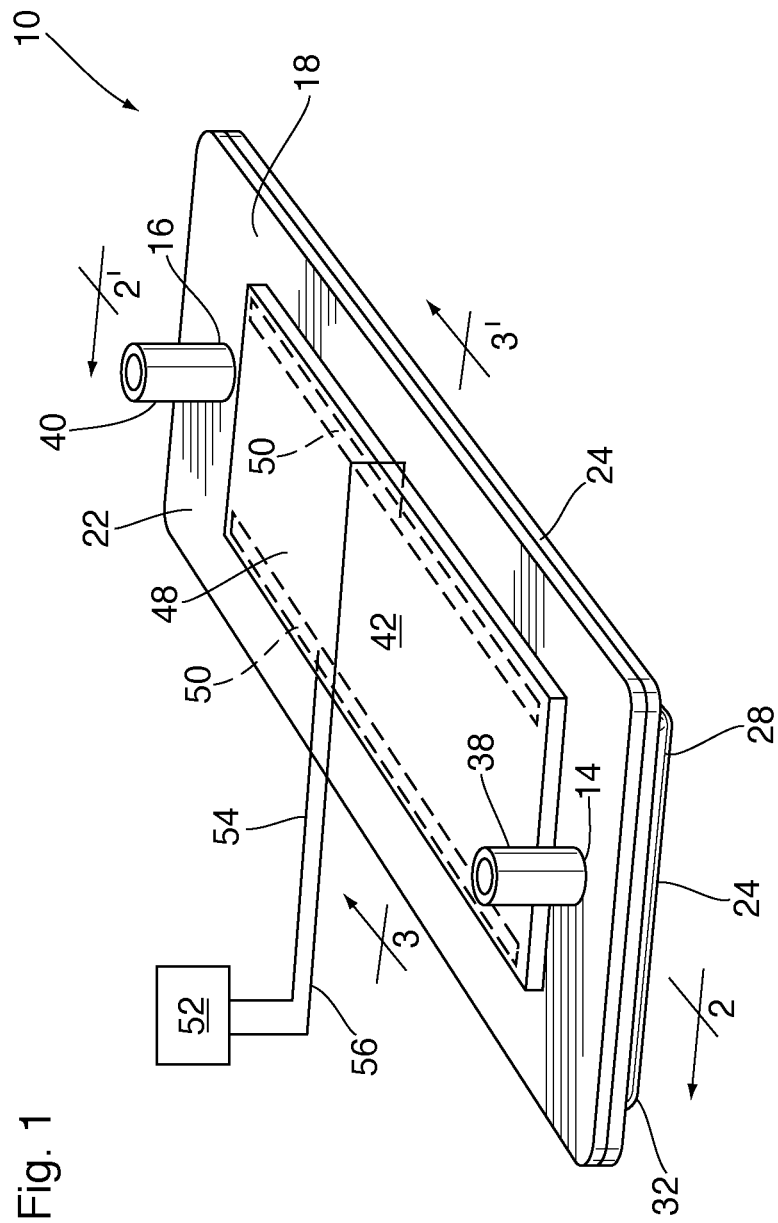
FIG. 1 is a top perspective view of a heat exchanger according to a first embodiment.

The following is a description of a heat exchanger 10 with an integrated electrical heating element according to an embodiment. In some embodiments, heat exchanger 10 is adapted for heating and optionally cooling a vehicle component 11 (schematically shown in FIG. 2 only) which is in contact with and/or supported on an outer surface of the heat exchanger 10. The vehicle component 11 may comprise at least one battery cell and/or battery module of a rechargeable vehicle battery for a BEV or HEV. In this regard, a typical rechargeable battery for a BEV or HEV will comprise a number of battery modules which are electrically connected together in series and/or in parallel to provide the battery with the desired system voltage and capacity. Each battery module comprises a plurality of battery cells which are electrically connected together in series and/or parallel, wherein the battery cells may be in the form of pouch cells, prismatic cells or cylindrical cells. The operation of the battery may be endothermic or exothermic, depending on temperature conditions.

In some embodiments, heat exchanger 10 is adapted for heating and optionally cooling an automotive fluid such as a coolant, engine oil, transmission fluid or axle fluid for an AWU or passenger cabin heating application, or a coolant for the vehicle battery. As such, the fluid flowing through the heat exchanger 10 will be generally referred to herein as an "automotive fluid", it being understood that the fluid may comprise any heat transfer fluid or lubricating fluid in a vehicle, particularly a BEV or HEV.

It will be appreciated that the elements of the various heat exchangers illustrated in the drawings are not drawn to scale. For example, the thicknesses and other dimensions of the various elements of the heat exchangers described herein, including the heating elements integrated therein, are not drawn to scale in the drawings. Also, the electrical connections for the heating elements are only shown schematically herein.

As shown in FIGS. 1 to 5, heat exchanger 10 is comprised of a fluid flow passage 12 adapted for flow of the automotive fluid, the fluid flow passage 12 having an inlet 14 and an outlet 16.

Heat exchanger 10 further comprises a first plate 18 and a second plate 24 which are in opposed facing relation to one another. The plates 18, 24 are thermally conductive and each have an inner surface facing inwardly toward the fluid flow passage 12 and an outer surface facing outwardly away from the fluid flow passage 12. In the drawings, the first plate 18 has inner surface 20 and an outer surface 22, and the second plate 24 has an inner surface 26 and an outer surface 28.

It will be seen that the fluid flow passage 12 is defined by a space between the inner surfaces 20, 26 of the first and second plates 18, 24. The first and second plates 18, 24 are sealed together at their peripheral edges, thereby sealing the edges of the fluid flow passage 12, and areas of the first and second plates 18, 24 located inwardly of the peripheral edges are spaced apart to define the fluid flow passage 12.

In the present embodiment, the first plate 18 is substantially completely flat and planar, with the inner and outer surfaces 20, 22 both being flat and planar. The second plate 24 is shaped, for example by stamping or drawing, such that it has a generally flat, planar base 30 surrounded on all sides by a raised peripheral sidewall 32 extending from the base 30 to a planar flange 34 defining a sealing surface on the inner surface 26 along which the planar flange 34 is sealed to a planar, peripheral sealing surface 36 on the inner surface 20 of first plate 18, for example by brazing or welding. It can be seen that the shaping of the second plate 24 in the present embodiment provides the space between the first and second plates 18, 24 in which the fluid flow passage 12 is provided, with the height of the fluid flow passage 12 being defined by a height difference between the base 30 and the planar flange 34.

In the present embodiment, the inlet port 14 and outlet port 16 are provided at opposite ends of heat exchanger 10 and comprise holes in the first plate 18. The inlet port 14 is provided with a tubular inlet fitting 38 and the outlet port 16 is provided with a tubular outlet fitting 40, the fittings 38, 40 allowing flow communication between the fluid flow passage 12 and a fluid circulation system (not shown) of the vehicle. Therefore, the automotive fluid makes one pass along the surfaces of the plates 18, 24 as it flows from the inlet 14 to the outlet 16. However, it will be appreciated that the fluid flow passage 12 may include one or more U-turns such that the automotive fluid will make two or more passes along the surfaces plates 18, 24 as it flows from the inlet 14 to the outlet 16. Depending on the configuration of the fluid flow passage 12, the inlet and outlet 14, 16 and their corresponding fittings 38, 40 may be located at the same end or at opposite ends of the heat exchanger 10.

The first and second plates 18, 24 may be comprised of aluminum or alloys thereof, and may be joined together by brazing in a brazing oven. In the following description and claims, any references to aluminum are to be understood as including aluminum alloys, such as 3000 series alloys. In order to facilitate brazing, a braze filler metal is provided between the surfaces being joined. The braze filler metal may be provided as a clad layer on the sealing surface of planar flange 34 of first plate 18, and/or the sealing surface 36 of second plate 24, a shim interposed between planar flange 34 and sealing surface 36, and/or a layer of clad brazing sheet interposed between flange 34 and sealing surface 36. Thus, the sealing surface of planar flange 34 and sealing surface 36 may not be in direct contact with one another, but rather may be sealed together through a layer of brazing filler metal and/or a brazing sheet, which are not shown in the drawings.

Although the first and second plates 18, 24 are shown as having the same or similar thickness, the first plate 18 may comprise a heat sink having a thickness which is greater than that of the second plate 24, sufficient to provide a heat dissipating, temperature spreading function.

Heat exchanger 10 is integrated with a first electrical heating element 42 provided outside the fluid flow passage 12 and located adjacent to the outer surface 20 of the first plate 18, such that heat produced by the electrical heating element 42 is transferred through the first plate 18 to the fluid in the fluid flow passage 12 during use of heat exchanger 10.

The first electrical heating element 42 may comprise a surface film heater comprising one or more layers. The heating element 42 will typically include at least one layer of conductive material to supply an electric current to the heating element 42, and at least one layer of a resistive material to convert the electric current into heat energy.

Figure 4:
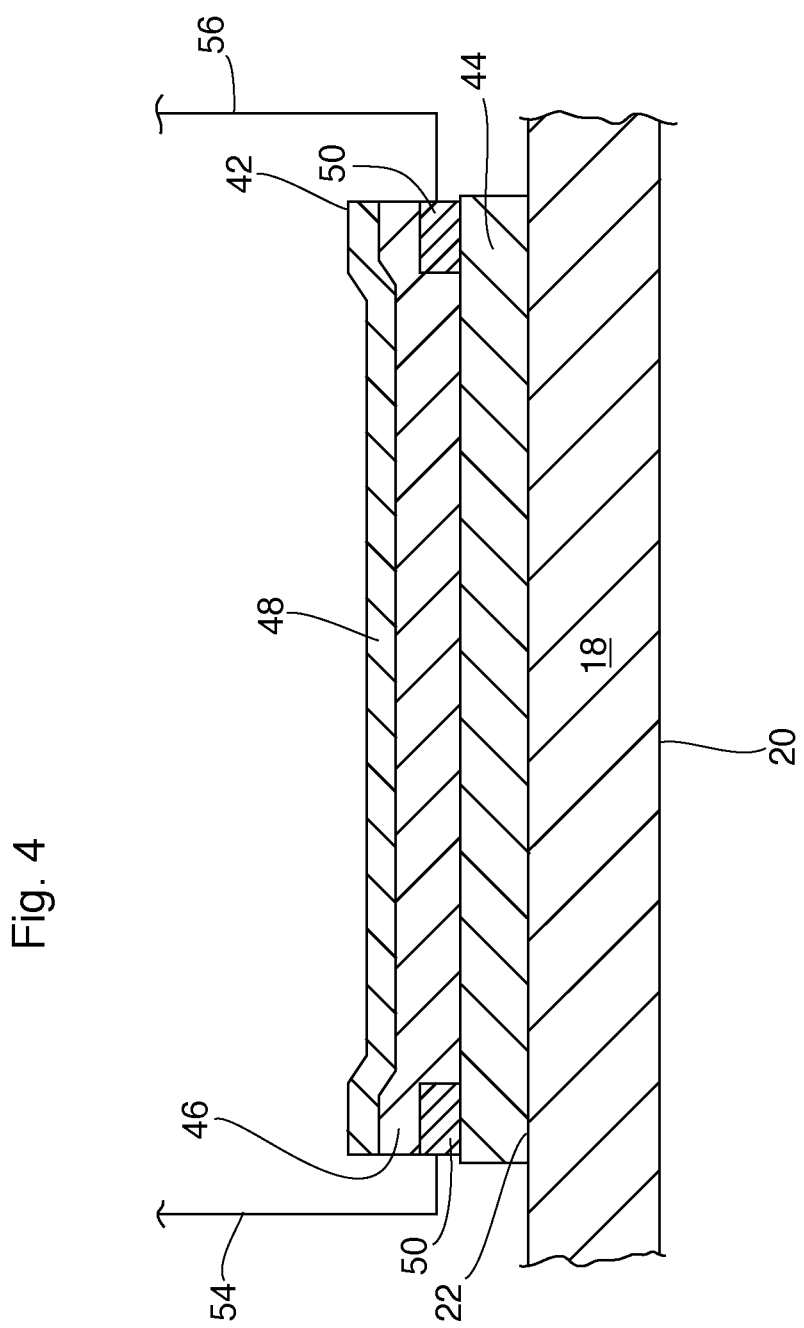
FIG. 4 is an enlarged transverse cross-section along line 3-3' of FIG. 1, showing portions of the electrical heating element and the first plate.
Figure 5:
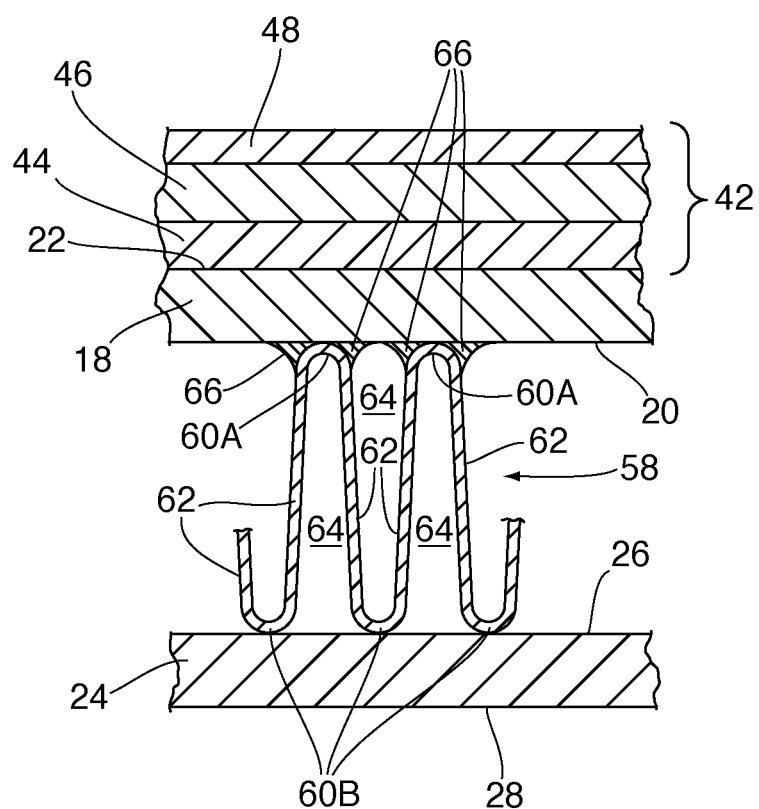
FIG. 5 is an enlarged transverse cross-section along line 3-3' of FIG. 1, showing portions of the turbulence-enhancing insert, the first and second plates, and the electrical heating element.

Various types of surface film heaters can be used as the first electrical heating element 42. In embodiments where the heat exchanger 10 is comprised of aluminum or an aluminum alloy, it is desirable that the first electrical heating element 42 comprises a surface film heater which is capable of bonding directly to an aluminum substrate. For example, as shown in FIG. 4, electrical heating element 42 may comprise an electrically insulating dielectric base layer 44 which is closest to the outer surface 22 of first plate 18; an electrically resistive heater layer 46 on the dielectric layer 44; an electrically insulating dielectric top layer 48 (or topcoat) on the resistive heater layer 46; and an electrically conductive layer 50 comprising one or more conductive strips/buss bars. The conductive layer 50 is in direct contact with the resistive heater layer 46 and the conductive strips comprising conductive layer 50 are shown in FIG. 4 as being located under the longitudinal edges of the resistive heater layer 46, between the resistive heater layer 46 and the dielectric base layer 44. However, it will be appreciated that the conductive layer 50 may instead be located on the resistive heater layer 46, between the resistive heater layer 46 and the dielectric top layer 48. The dielectric base layer 44 and dielectric top layer 48 are disclosed herein as being thermally conductive. However, the dielectric base and top layers 44, 48 are not necessarily comprised of highly thermally conductive materials, in which case the layers 44 and/or 48 may be made thinner to enhance their thermal conductivity. Therefore, it will be understood that the phrase "thermally conductive" as used herein may refer to structural properties of the layers 44, 48 (e.g. thickness), and/or to their material properties.

Surface film heaters having the above-described structure of the first electrical heating element 42 can be applied to an aluminum substrate by deposition of several successive layers using techniques such as screen printing. The first electrical heating element may typically have a thickness from about 1 μm to about 1000 μm. For example, the electrical heating element 42 may have a thickness of from about 1 μm to about 700 μm, or from about 150 μm to about 600 μm, or from about 250 μm to about 500 μm, for example from about 250 μm to about 300 μm. Surface film heaters having this layered structure and this range of thicknesses are sometimes referred to as "thick film" heaters.

The term "thick film" as used herein refers to coatings that in general are >1 μm in thickness. While the terms "thick film" and "thin film" are relative, in the coatings industry, "thin film" generally refers to technologies using nano or submicron thick coatings which are applied by techniques which may lay down atomic thick layers of the coating. Thick film coatings on the other hand are deposited in one or more successive layers using techniques such as screen printing.

Surface film heating elements such as thick film heat elements are advantageous for vehicle applications because they provide versatile designs, high power densities, uniform heat, and rapid heating and cooling. In addition, such heating elements are low-profile and lightweight. In particular, the inventors have found that surface film heating elements are effective for direct heating of vehicle components to be heated, such as rechargeable lithium-ion batteries as used in BEVs and HEVs, and/or for indirect heating of vehicle components (including the passenger cabin) by heating a fluid which transfers heat to these vehicle components. Further, when a surface film heating element is integrated with a heat exchanger, as described herein, the inventors have found that the same heat exchanger which is used for direct or indirect heating of vehicle components with the heating element activated, may be used for direct or indirect cooling of vehicle components with the heating element de-activated.

Where the plates 18, 24 comprising the heat exchanger 10 are comprised of aluminum or alloys thereof, the processing temperatures for applying and/or curing the coatings making up the electrical heating element 42 have an upper limit of about 600° C., because aluminum has a relatively low melting temperature of about 660° C., with alloys such as 3000 series alloys having somewhat lower melting temperatures. The electrical heating element 42 may withstand temperatures as high as about 500° C.

The dielectric base layer 44 is directly applied to an external surface of the heat exchanger 10 and thermally processed at temperatures below 600° C., for example in the range from about 400 to about 450° C. Thermal processing may be performed in air using a conventional furnace or IR heating, and results in bonding of the dielectric base layer 44 to the aluminum substrate, referred to herein as a "thermal bond".

In addition to having a low melting temperature, aluminum has a relatively high coefficient of thermal expansion. Where the dielectric base layer 44 has a coefficient of thermal expansion which is significantly different from that of the aluminum comprising heat exchanger 10, the dielectric base layer 44 can crack and/or become disbonded from the heat exchanger 10 during thermal cycling of the heat exchanger 10 and/or the electrical heating element 42. Due to these limitations, conventional insulating layers comprised of glass enamel are not suitable for such applications, since they are typically applied and/or cured at temperatures above the melting temperature of aluminum, and have lower coefficients of thermal expansion than aluminum.

The dielectric base layer 44 of electrical heating element 42 is comprised of a material having processing and melting temperatures less than 600° C.; having a relatively high coefficient of thermal expansion to match that of aluminum; and having suitable electrical insulation properties under thermal cycling of up to about 250° C. For example, the dielectric base layer 44 may be a thermally conductive, electrically insulating composite layer comprising a high temperature melt-flowable thermoplastic polymer mixed with a particulate filler material.

The particulate filler incorporated into the thermoplastic polymer matrix provides improved thermal expansion coefficient matching between the dielectric base layer 44 and the aluminum heat exchanger substrate 10 and with other layers of the electrical heating element 42. The particulate filler also increases the thermal conductivity of the dielectric base layer 44 to produce better heat transfer to the aluminum substrate and prevent generation of "hot spots" in the electrical heating element 42. The particulate filler also serves to reinforce the dielectric base layer 44, and prevents the subsequently applied layers of the electrical heating element 42 from sinking into the dielectric base layer 44 during application and/or curing of these subsequent layers.

The melt-flowable high temperature thermoplastic polymer of the dielectric layer 44 is selected from the group comprising polyphenylene sulfide (PPS), polyphthalamide (PPA), polyarylamide (PARA), liquid crystal polymer, polysulfone (PS), polyethersulfone (PES), polyphenylsulfone (PPSU), polyamide-imide (PAI), polyetheretherketone (PEEK), polyetherketone (PEK), polyetherketoneetherketone (PEKEK), self-reinforced polyphenylene (SRP), and combinations of any two or more thereof.

The particulate filler of the dielectric layer 44 is selected from the group comprising ceramics, glass or high temperature polymer particles. Examples of suitable ceramic materials include alumina, zirconia, silica, (optionally ceria stabilized zirconia or yttria stabilized zirconia), titania, calcium zirconate, silicon carbide, titanium nitride, nickel zinc ferrite, calcium hydroxyapatite and any combinations thereof. Alumina has the highest thermal conductivity and dielectric strength.

The filler material may have a particle size in the range from about 0.1 microns to about 100 microns, for example from about 0.1 to about 20 microns. The filler content of the dielectric base layer 44 is from about 5-80 weight percent, for example from about 20-60 weight percent, or for example from 35-45 weight percent.

Heat generated by the resistive heater layer 46 passes through the dielectric base layer 44 to the first plate 18, and the dielectric base layer 44 withstands continuous high operating temperatures, maintaining a solid structure at temperatures of about 180° C. or higher, and/or under thermal cycling of up to about 250° C. In addition, the dielectric base layer 44 resists electrical breakdown and current leakage between the first plate 18 and the resistive heater layer 46 and/or the conductive layer 50. The dielectric base layer 44 may be a monolithic coating or it may comprise two or more coatings cured one on top of the other. Each of the coatings comprising the dielectric base layer 44 may have the same or different composition in terms of any one or more of the type and/or amount of melt-flowable high temperature thermoplastic polymer an/or the particular filler.

The resistive heater layer 46 may comprise an electrically resistive lead-free composite sol gel-based layer. The sol gel formulation contains reactive metal organic or metal salt sol gel precursors that are thermally processed after application on the dielectric base layer 44 to form an electrically resistive ceramic material which becomes heated when a voltage is applied to it. The sol gel formulation is a solution containing reactive metal organic or metal salt sol gel precursors that are thermally processed to form a ceramic material selected from the group comprising alumina, silica, zirconia, (optionally ceria stabilized zirconia or yttria stabilized zirconia), titania, calcium zirconate, silicon carbide, titanium nitride, nickel zinc ferrite, calcium hydroxyapatite and any combinations thereof.

The conductive layer 50 is deposited either before or after the resistive heater layer 46 and provides an electrical connection between an electrical power supply 52 and the resistive heater layer 46. The conductive layer 50 is lead-free and may be produced from a composite sol gel formulation that contains nickel, silver or any other suitable conductive powder or flake material. The sol gel formulation may be prepared from, but is not limited to, alumina, silica, zirconia, or titania metal organic precursors stabilized in solution. The conductive layer 50 is electrically connected to power supply 52 by any suitable means, such as electrical leads 54, 56 as shown in FIG. 4.

The electrically insulating dielectric top layer 48 is electrically insulating and may contain ceramic, glass or low melt flow high temperature polymer filler particles, and is deposited on top of the resistive heater layer 46 and/or conductive layer 50 to protect layers 46 and 50 from damage caused by oxidation, water, etc. It will be appreciated that the top layer 48 is optional, and may not be required in all embodiments.

In use, the power supply 52 supplies a suitable voltage and electrical current to the conductive layer 50 through leads 54, 56 to heat it. The power supply 52 may supply an AC or DC voltage. For use in BEVs and HEVs, the voltage will be at least 48V, for example 280V, and possibly greater than 300V. The conductive layer 50 is structured so that the resistive heater layer 46 will become heated as uniformly as possible across its surface area. In some embodiments, the resistivity of the resistive heater layer 46 is about 48-100 ohms/square, with the resistor heat flux (power density) being up to about 25 W/cm$^2$ (160 W/in$^2$) or greater.

Additional details regarding the composition and structure of the electrical heating element 42 can be found in U.S. Pat. No. 8,653,423, which is incorporated herein by reference in its entirety. In the first embodiment shown in FIGS. 1-5, the first electrical heating element 42 is applied directly to the outer surface 22 of first plate 18, with the dielectric base layer 44 in direct contact with and thermally bonded directly to outer surface 22 of first plate 18. To provide improved uniformity and adhesion, the outer surface 22 of first plate 18 is flat, and may optionally be surface treated by abrasion, rubbing or sandblasting.

Where the heat exchanger 10 is comprised of aluminum or aluminum alloy, it will be assembled by brazing and/or welding. These assembly steps are performed before application of the first electrical heating element 42 to the first plate 18, for example by a screen printing process. Therefore, according to the present embodiment, the electrical heating element 42 is applied after the other components of heat exchanger 10 are fully assembled.

Heat exchanger 10 may further comprise a turbulence-enhancing insert 58 such as a corrugated fin or a turbulizer in order to provide increased turbulence and surface area for heat transfer, thereby enhancing heat transfer from the electrical heating element 42 to the fluid in fluid flow passage 12. The turbulence-enhancing insert 58 also provides structural support for the first and second plates 18, 24, thereby enhancing rigidity of the heat exchanger 10.

As used herein, the terms "fin" and "turbulizer" are intended to refer to corrugated turbulence-enhancing inserts 58 having a plurality of ridges or crests 60 connected by side walls 62, with the ridges being rounded or flat. As defined herein, a "fin" has continuous ridges whereas a "turbulizer" has ridges which are interrupted along their length to provide a tortuous flow path. Turbulizers are sometimes referred to as offset or lanced strip fins, and examples of such turbulizers are described in U.S. Patent No. Re. 35,890 (So) and U.S. Pat. No. 6,273,183 (So et al.). The patents to So and So et al. are incorporated herein by reference in their entireties.

In most applications, such as in heat exchanger 10, the turbulence-enhancing insert 58 is oriented inside the fluid flow passage 12 with its ridges 60 arranged parallel to the direction of fluid flow through the fluid flow passage 12, such that the fluid flows through the openings 64 defined by the ridges 60 and side walls 62. This orientation of the insert 58 is referred to herein as the "low pressure drop" or "LPD" orientation. Alternatively, in some applications, the turbulence-enhancing insert 58 will be oriented inside the fluid flow passage 12 with its ridges 60 angled relative to the direction of fluid flow through fluid flow passage 12, the angle typically being 90 degrees. This orientation of the insert is referred to herein as the "high pressure drop" or "HPD" orientation. In the HPD orientation the fluid flows through openings in the side walls 62 and/or other interruptions in the side walls 62 or ridges 60 of the insert 58.

In heat exchanger 10, the turbulence-enhancing insert 58 has a first plurality of ridges 60A (referred to herein as the "top ridges") which are in contact with the inner surface 20 of first plate 18, and a second plurality of ridges 60B (referred to herein as the "bottom ridges") which are in contact with the inner surface 26 of the second plate 24.

According to another feature of heat exchanger 10, the top ridges 60A of the turbulence-enhancing insert 58 are in intimate thermal contact with the inner surface 20 of first plate 18. For example, the top ridges 60A of turbulence-enhancing insert 58 may be metallurgically bonded, for example by brazing, to the inner surface 20 of first plate 18. This is illustrated in the close-up of FIG. 5, which shows braze fillets 66 comprised of solidified braze filler metal. As an alternative to metallurgical bonding, intimate thermal contact can be achieved by pressure or an adhesive bond.

While metallurgically bonding a turbulence-enhancing insert to a plate in a conventional heat exchanger would be expected to enhance heat transfer from the fluid flowing through the heat exchanger to the plate, the inventors have found that metallurgically bonding the insert 58 to first plate 18 provides a number of additional benefits in heat exchanger 10, where an electrical heating element 42 is located on the opposite side of the first wall 18. For example, the inventors have found that metallurgically bonding the insert 58 to inner surface 20 of first plate 18 results in a more uniform temperature distribution across the surface area of the first plate 18. This reduces the incidence of hot spots on first plate 18, which reduces the risk of boiling the fluid inside the fluid flow passage 12.

Furthermore, the inventors have found that metallurgically bonding the insert 58 to inner surface 20 of first plate 18 causes the electrical heating element 42 and the plate 18 to which it is attached to run at lower temperatures. For example, at a heat flux of 24 W/cm$^2$, a heat exchanger without a metallurgically bonded insert 58 had a temperature of 170° C. in the resistive heater layer 46; 123° C. in the dielectric base layer 44; and 120° C. in the first plate 18 and fluid flow passage 12. In contrast, a heat exchanger with a metallurgically bonded insert 58 had a temperature of 110° C. in the resistive heater layer 46; 63° C. in the dielectric base layer 44; and 60° C. in the first plate 18 and fluid flow passage 12. It will be appreciated that the lower temperatures in the heat exchanger with the metallurgically bonded insert 58 will permit the heater to run with a higher heat flux.

Heat exchanger 10 includes only a first electrical heating element 42 which is located adjacent to the outer surface 22 of first plate 18, while there is no corresponding heating element provided along the outer surface 28 of second plate 24. In this embodiment, the bottom ridges 60B of the turbulence-enhancing insert 58 may or may not be in intimate thermal contact with the inner surface 26 of the second plate 24, for example by not providing a metallurgically bond between bottom ridges 60B and second plate 24.

Figure 2:
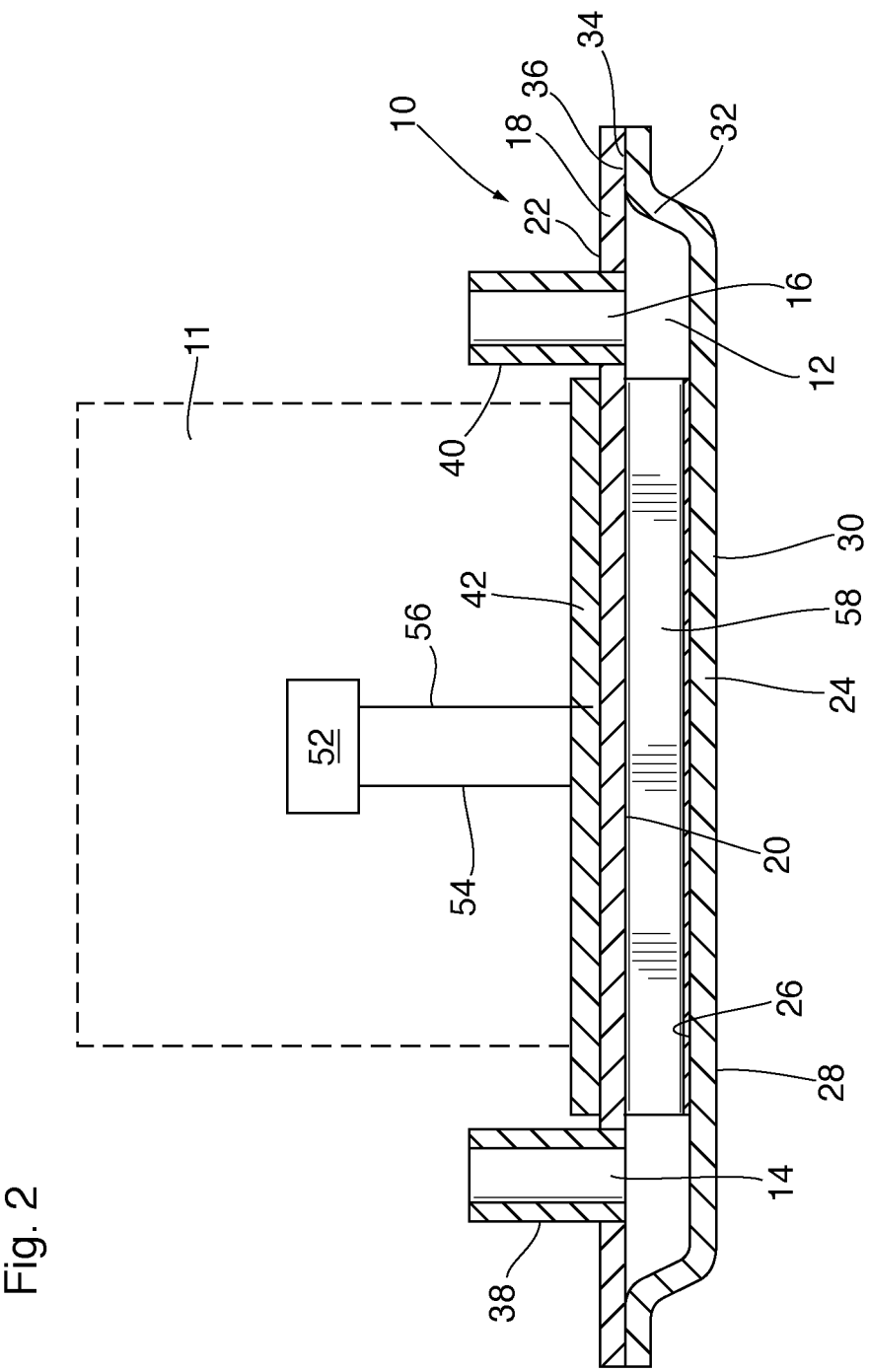
FIG. 2 is a longitudinal cross-section along line 2-2' of FIG. 1.
Figure 3:
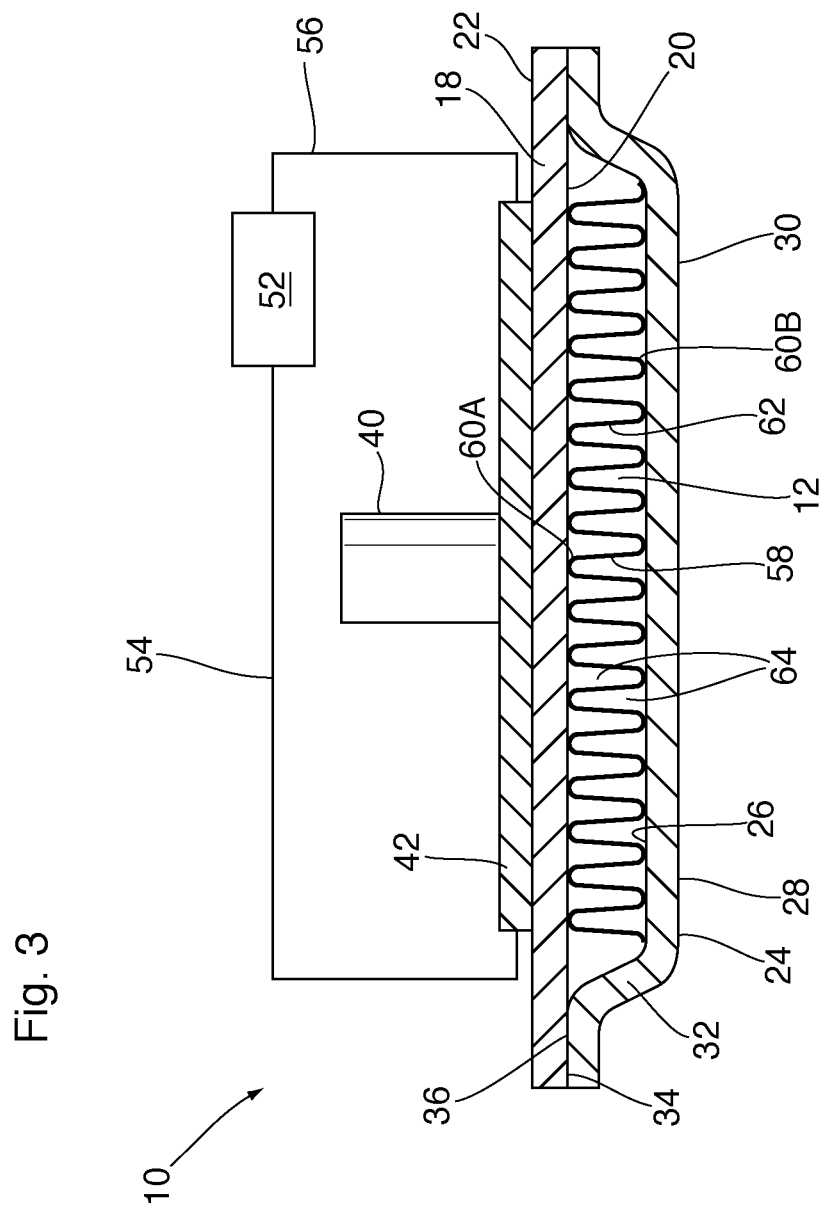
FIG. 3 is a transverse cross-section along line 3-3' of FIG. 1.

In use, heat exchanger 10 can be used for directly and/or indirectly heating, and optionally cooling, one or more vehicle components 11. For example, indirect heating of a vehicle component 11 may be accomplished by activating one or both of the electrical heating elements 42 to heat a fluid flowing through the heat exchanger 10, followed by heat transfer from the heated fluid to one or more vehicle components 11 to be heated, including the passenger cabin. Direct heating of one or more vehicle components 11 may be accomplished by mounting or placing one or more vehicle components 11 to be heated in contact with one or more of the flat, external surfaces of the heat exchanger 10. For example, as shown in FIG. 2, a vehicle component 11 can be mounted on or placed in contact with the flat top surface of the heat exchanger 10, i.e. on top of the electrical heating element 42. Alternatively, a vehicle component 11 can be mounted or placed in contact with the bottom surface of heat exchanger 10, i.e. on the outer surface 28 of the second plate 24. In other embodiments, the vehicle component 11 is located remote from the vehicle component 11 and the heat exchanger 10 is used to heat and/or cool a fluid for indirect heating and/or cooling of the vehicle component 11.

For example, where the vehicle component 11 comprises at least one battery cell and/or battery module of a rechargeable vehicle battery, the heat exchanger 10 may comprise a "cold plate" battery heat exchanger; wherein the vehicle component 11 is in contact with, and may be supported on, the electrical heating element 42 provided on the outer surface 22 of first plate 18; or wherein the vehicle component 11 is in contact with, and may be supported on, the outer surface 28 of second plate 24.

Therefore, in some embodiments, the heat exchanger 10 is a cold plate in which the outer surface 22 of the first plate 18 is substantially flat, and the electrical heating element 42 is in direct contact with a substantially flat portion of the outer surface 22. In an embodiment, the electric heating element 42 is adapted for contact with and support of vehicle component 11, which comprises at least one battery cell and/or battery module of a rechargeable vehicle battery. Such an embodiment is illustrated in FIG. 2.

In other embodiments, heat exchanger 10 comprises a cold plate in which the outer surface 28 of the second plate 24 is substantially flat, and is adapted for contact with and support of vehicle component 11, which comprises at least one battery cell and/or battery module of a rechargeable vehicle battery. In such embodiments, the electrical heating element 42 may be in direct contact with the outer surface 22 of the opposite first plate 18.

When it is desired to use heat exchanger 10 to heat a vehicle component 11, the power supply 52 supplies electrical energy to the conductive layer 50 through leads 54, 56. The electric current flowing through the conductive layer 50 is converted to heat energy by the resistive heater layer 46, which is transferred to the fluid in flow passage 12 through the first and second plates 18, 24. The vehicle component 11 will be heated directly or indirectly by the fluid which is heated within the fluid flow passage 12, by the plates 18, 24 of heat exchanger (i.e. where the vehicle component 11 is mounted on or in contact with the top or bottom surface of heat exchanger 10), and/or the vehicle component will be heated directly by the electrical heating element 42 (where component 11 is on top of the heating element 42 as in FIG. 2). As mentioned above, the fluid heated in the flow passage 11 can be circulated to other areas of the vehicle to provide direct or indirect heating of other vehicle component(s) 11, and/or may be re-circulated through heat exchanger 10 for further heating of the fluid and/or vehicle component 11.

When it is desired to use heat exchanger 10 to cool a vehicle component 11, the power supply 52 is de-activated such that heat is no longer produced by the electrical heating element 42. Accordingly, in cooling mode, the heat exchanger 10 functions as a conventional cooler 10, for example to provide cooling of a vehicle component 11 mounted on or in contact with the top or bottom surface of heat exchanger 10. In cooling mode, a cooling fluid such as a liquid coolant having a lower temperature than the vehicle component 11 is received from the vehicle's coolant circulation system and is circulated through the fluid flow passage 12 to absorb heat generated by the vehicle component 11, which may be a rechargeable battery or other heat-generating component.

Some additional embodiments of heat exchangers are now described below.

Figure 6:
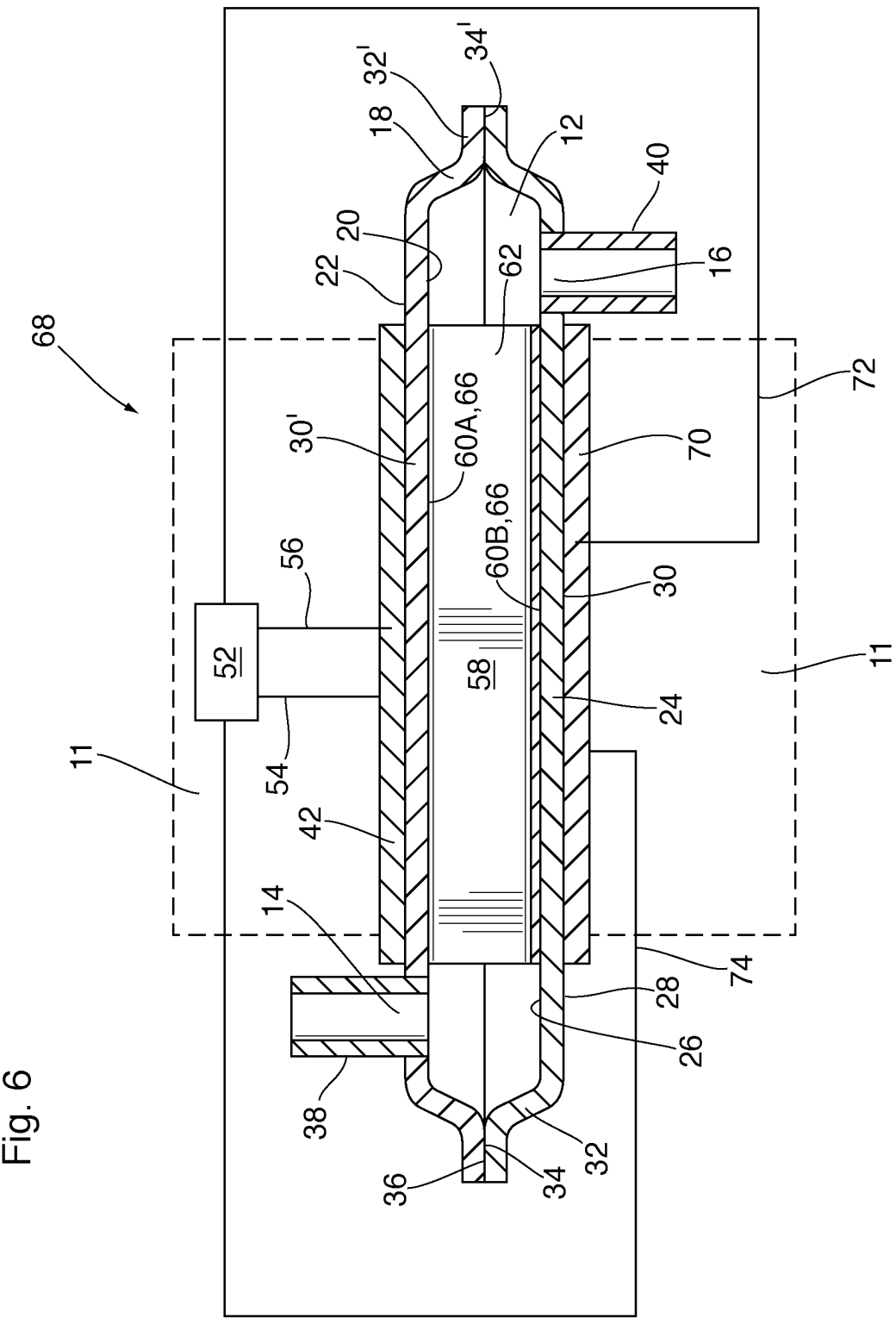
FIG. 6 is a longitudinal cross-section through a heat exchanger according to a second embodiment.
Figure 7:
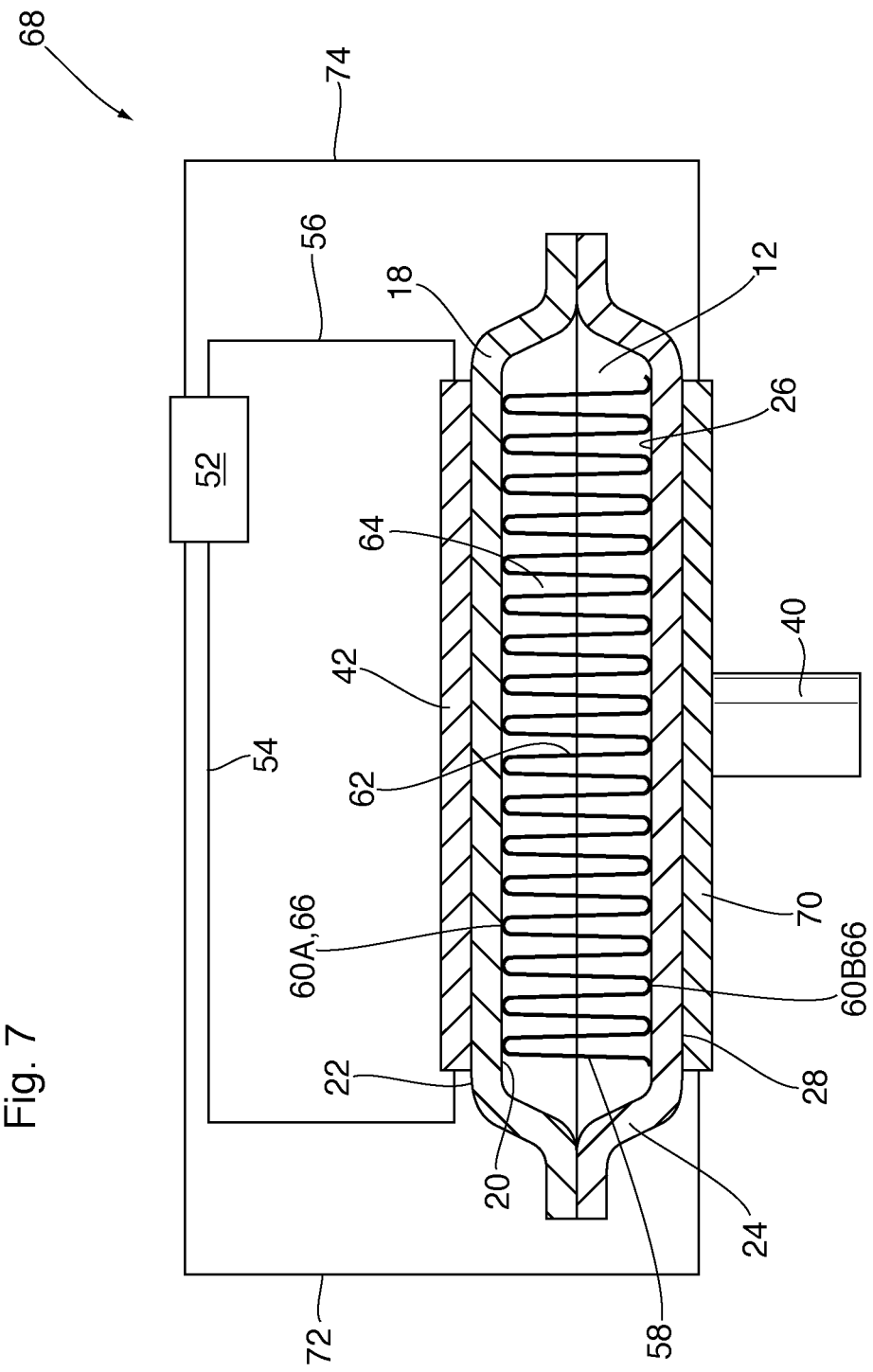
FIG. 7 is a transverse cross-section through the heat exchanger according to the second embodiment.

FIGS. 6 and 7 show a heat exchanger 68 which is similar to heat exchanger 10 in a number of respects and in which like reference numerals are used to identify like elements. Unless otherwise indicated, the above description of the like elements of heat exchanger 10 apply equally to heat exchanger 68, and the following discussion will focus primarily on the differences between heat exchangers 10 and 68.

Instead of a flat first plate 18, the first plate 18 of heat exchanger 68 is a shaped plate which is similar or identical to the second plate 24, and is formed with a flat, planar base 30' surrounded by a raised peripheral sidewall 32' extending from the base 30' to a planar flange 34' defining a sealing surface which is sealed to the corresponding planar sealing surface 36 of the second plate 24.

Heat exchanger 68 also differs from heat exchanger 10 in that heat exchanger 68 includes a first electrical heating element 42 adjacent to the outer surface 22 of first plate 18, and a second electrical heating element 70 adjacent to the outer surface 28 of second plate 24. The second electrical heating element 70 may be identical to the first electrical heating element 42 described above, comprising a dielectric base layer 44, resistive heater layer 46, dielectric top layer 48 and conductive layer 50, and heating element 70 may be connected to the same power supply 52 by electrical leads 72, 74.

The second electrical heating element 70 may be applied directly to the outer surface 28 of second plate 24, with the dielectric base layer 44 in direct contact with and adhered to outer surface 28 of second plate 24. To provide improved uniformity and adhesion, the outer surface 28 of second plate 24 is flat, and may optionally be surface treated by abrasion, rubbing or sandblasting.

Where the heat exchanger 68 is comprised of aluminum or an aluminum alloy, the aluminum components of heat exchanger 68 are fully assembled by brazing and/or welding before application of the first and second electrical heating elements 42, 70 to the first and second plates 18, 24, for example by a screen printing process.

In addition, it can be seen that the locations of the inlet and outlet ports 14, 16 differs in heat exchanger 68. In particular, the inlet port 14 and inlet fitting 38 are provided in the first plate 18, and the outlet port 16 and outlet fitting 40 are provided in the second plate 24. With this configuration, the first and second plates 18, 24 may be identical to one another.

Heat exchanger 68 includes a turbulence-enhancing insert 58 as described above, which is in thermal contact with, for example by metallurgical bonding, to inner surface 20 of first plate 18. Because heat exchanger 68 also includes a second electrical heating element 70 adjacent to the outer surface 28 of second plate 24, the bottom ridges 60B of the turbulence-enhancing insert 58 are also in intimate thermal contact with the inner surface 26 of the second plate 24, for example by metallurgical bonding by braze fillets 66 as described above.

Although heat exchanger 68 includes a number of features which differ from those of heat exchanger 10, it will be appreciated that heat exchanger 10 can be modified to have any one of the different features of heat exchanger 68 which are specifically described above, i.e. heat exchanger 10 can be modified to include any one or more of: a shaped first plate 18 with base 30', raised peripheral sidewall 32' and planar flange 34'; a second electrical heating element 70 adjacent to the outer surface 28 of second plate 24; the location of the inlet port 14 and inlet fitting 38 or the outlet port 16 and outlet fitting 40 in the second plate 24; and the bottom ridges 60B of the turbulence-enhancing insert 58 being in intimate thermal contact, and optionally metallurgically bonded to, the inner surface 26 of the second plate 24.

In use, heat exchanger 68 can be used to heat and/or cool one or more vehicle component(s) 11 as described above with reference to heat exchanger 10. For example, FIG. 6 shows vehicle components 11 mounted to or in contact with the electrical heating elements 42, 70 on both the top and bottom surfaces of heat exchanger 68. In heating mode, the electrical heating elements 42, 70 are activated so as to heat the fluid in passage 12 and the plates 18, 24, and also to directly heat the vehicle components 11. In cooling mode, a coolant at a lower temperature than the vehicle components 11 is passed through the fluid flow passage 12 so as to absorb heat generated by vehicle components 11, to thereby cool the vehicle components 11. It will be appreciated that it is not necessary to have vehicle components 11 mounted to or in contact with the top and bottom of heat exchanger 68. For example, in some embodiments, one vehicle component 11 to be heated and/or cooled is mounted on or is in contact with the electrical heating element 42 or 70, and/or one or more vehicle component(s) 11 is located remote from the heat exchanger 68 to be heated directly or indirectly by fluid heated within the fluid flow passage 12.

Figure 8:
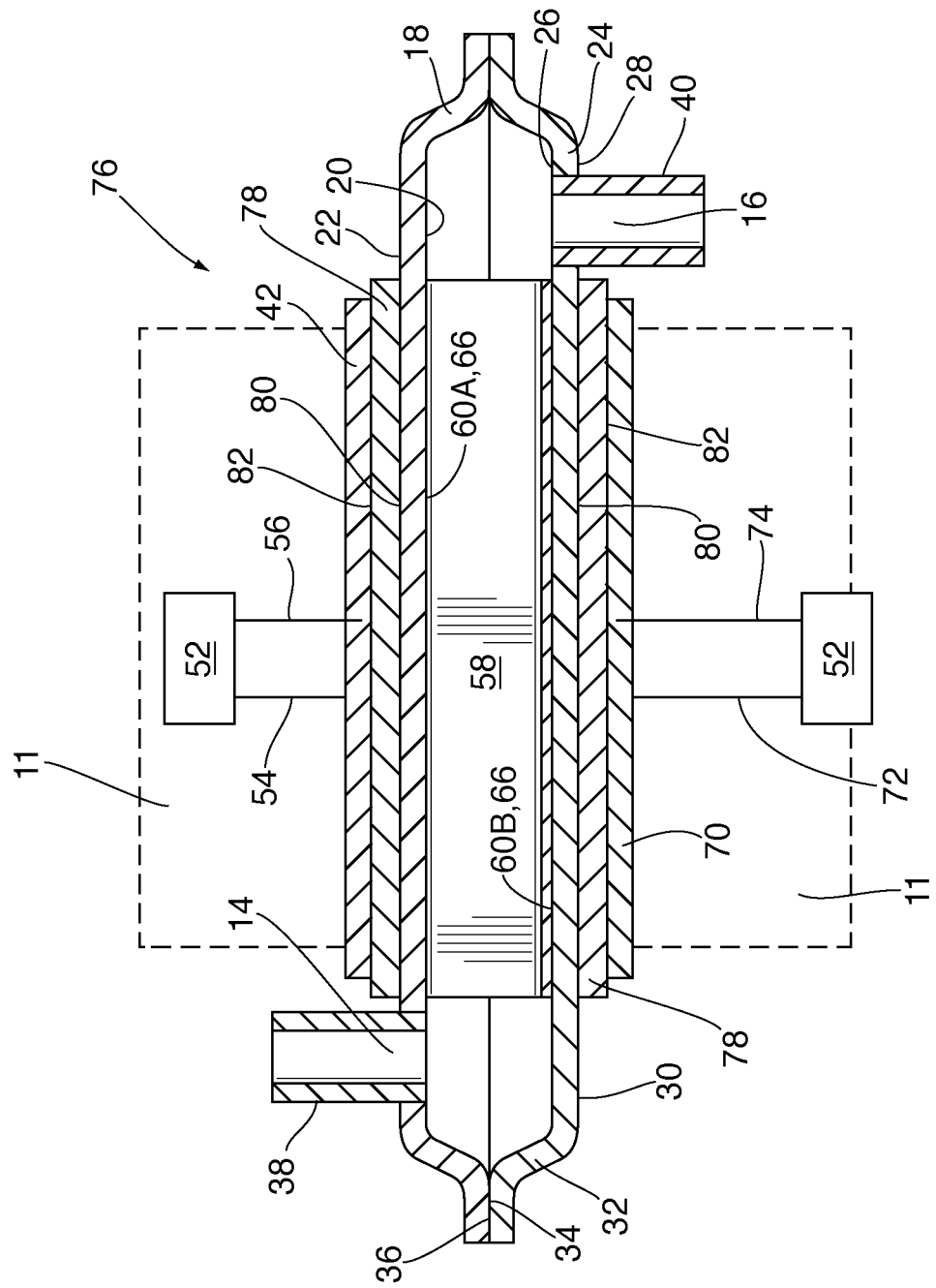
FIG. 8 is a longitudinal cross-section through a heat exchanger according to a third embodiment.

FIG. 8 shows a longitudinal cross-section of a heat exchanger 76 which is similar to heat exchangers 10 and 68 in a number of respects and in which like reference numerals are used to identify like elements. Unless otherwise indicated, the above description of the like elements of heat exchangers 10 and 68 apply equally to heat exchanger 76, and the following discussion will focus primarily on the ways in which heat exchanger 76 differs from heat exchangers 10 and 68.

Instead of having a first electrical heating element 42 which is applied directly to the outer surface 28 of second plate 24, with the dielectric base layer 44 in direct contact with and adhered to outer surface 28 of second plate 24, heat exchanger 76 has an intermediate heat sink plate 78 to which the first electrical heating element 42 is applied.

The heat sink plate 78 comprises a flat plate which may be thicker than the first and second plates 18, 24, having an inner surface 80 which is fixed to the outer surface 22 of the first plate 18, and an outer surface 82 to which the first electrical heating element 42 is applied, for example by screen printing, and thermally bonded. The heat sink plate 78 may be fixed to the first plate 18 by a metallurgical bond such as a braze joint or a weld joint, so as to maximize heat transfer through the heat sink plate 78, from the heating element 42 to the first plate 18 and the fluid in passage 12.

It will be appreciated that heat exchanger 10 can be modified to include a heat sink plate 78 as described above, having an inner surface 80 fixed to the outer surface 22 of first plate 18, and an outer surface 82 to which the first electrical heating element 42 is applied. Alternatively, the flat first plate 18 of heat exchanger 10 may itself comprise a heat sink plate, with a thickness which is greater than that of the second plate 24. Also, as shown in FIG. 8, heat exchanger 76 can include a second heat sink plate 78 having an inner surface 80 fixed to the outer surface 28 of second plate 24, and having an outer surface 82 to which the second electrical heating element 70 is applied. Also, as shown in FIG. 8, the second electrical heating element 70 may be connected to a second electrical power supply 52 through leads 72, 74.

Heat exchanger 76 can be manufactured by first assembling all components of the heat exchanger 76 other than electrical heating elements 42 and/or 70 (including first and second plates 18, 24, turbulence-enhancing insert 58, and heat sink(s) 78), followed by direct application of the electrical heating elements 42 and/or 70 to the outer surface(s) 82 of heat sink plate(s) 78 in the manner described above with reference to heat exchangers 10 and 68.

Alternatively, heat exchanger 76 can be manufactured by: (1) pre-assembling the including first and second plates 18, 24 (and a turbulence-enhancing insert 58 where one is provided); (2) directly applying the electrical heating elements 42 and/or 70 to the outer surface(s) 82 of heat sink plate(s) 78 in the manner described above with reference to heat exchangers 10 and 68; and (3) attaching the heat sink plate(s) 78 with the attached electrical heating elements 42 and/or 70 to the outer surface 22 of first plate 18 and/or the outer surface 28 of second plate 24, wherein the inner surface 80 or each heat sink plate 78 is in intimate thermal contact with, and optionally metallurgically bonded to, the outer surface 22 or 28 of the first or second plate 18 or 24.

Aside from the presence of heat sink plates 78, it will be appreciated that the transverse cross section of heat exchanger 76, which is not shown, is the same as that of heat exchanger 68 described above.

In use, heat exchanger 76 can be used to heat and/or cool one or more vehicle component(s) 11 as described above with reference to heat exchangers 10 and 68. For example, FIG. 8 shows vehicle components 11 mounted to or in contact with the electrical heating elements 42, 70 on both the top and bottom surfaces of heat exchanger 76. In heating mode, the electrical heating elements 42, 70 are activated so as to heat the fluid in passage 12 and the plates 18, 24, and also to directly heat the vehicle components 11. In cooling mode, a coolant at a lower temperature than the vehicle components 11 is circulated through the fluid flow passage 12 to absorb heat generated by vehicle components 11, to thereby cool the vehicle components 11. It will be appreciated that it is not necessary to have vehicle components 11 mounted to or in contact with the top and bottom of heat exchanger 76. For example, in some embodiments, one vehicle component 11 to be heated and/or cooled is mounted on or is in contact with the electrical heating element 42 or 70, and/or one or more vehicle component(s) 11 is located remote from the heat exchanger 76 to be heated directly or indirectly by fluid heated within the fluid flow passage 12.

Figure 9:
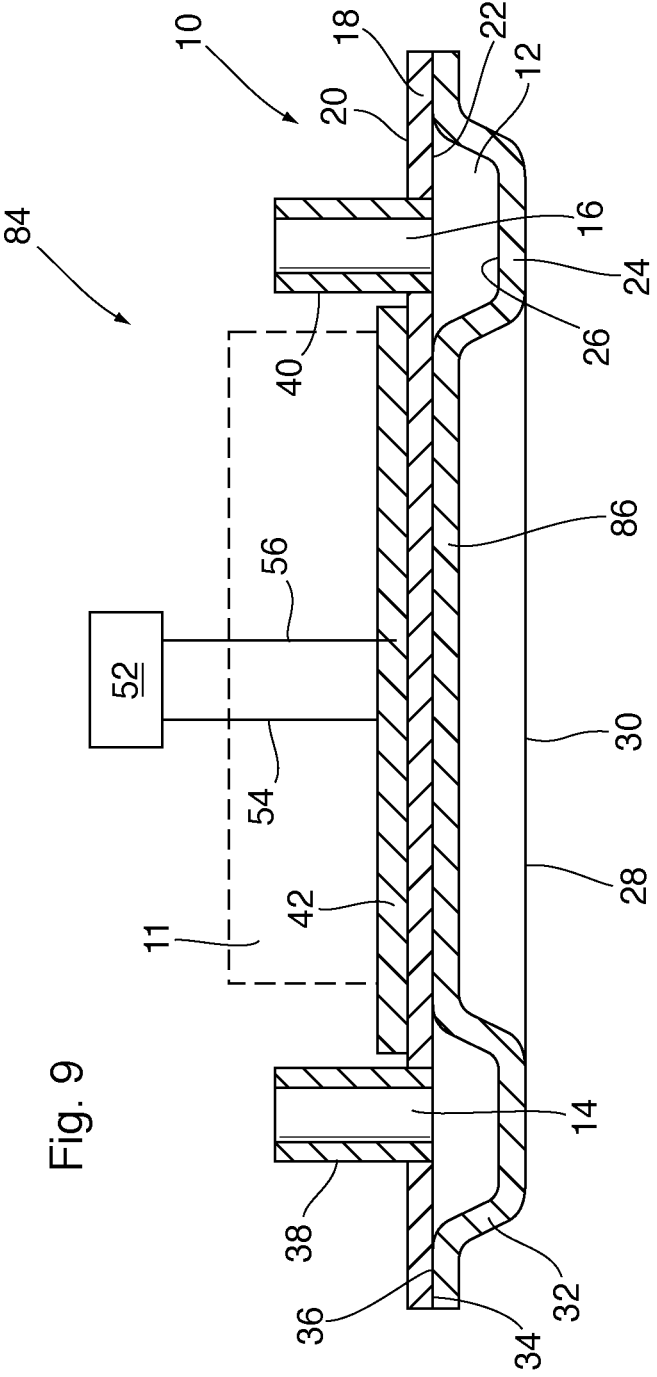
FIG. 9 is a longitudinal cross-section through a heat exchanger according to a fourth embodiment.

Heat exchangers 10, 68 and 76 described above include turbulence-enhancing inserts 58 in the form of corrugated fins or turbulizers. FIG. 9 shows a heat exchanger 84 which is similar to heat exchangers 10, 68 and 76 in a number of respects and in which like reference numerals are used to identify like elements. Unless otherwise indicated, the above descriptions of the like elements of heat exchangers 10, 68 and 76 apply equally to heat exchanger 84, and the following discussion will focus primarily on the ways in which heat exchanger 84 differs from heat exchangers 10, 68 and 76.

In heat exchanger 84, the corrugated fin or turbulizer is replaced by a plurality of turbulence-enhancing features which are formed directly in one or both of the first plate 18 and second plate 24. In this regard, one or both of the first and second plates 18, 24 may be provided with a plurality of protrusions 86, the protrusions being formed in the plate by stamping or drawing.

Figure 10:
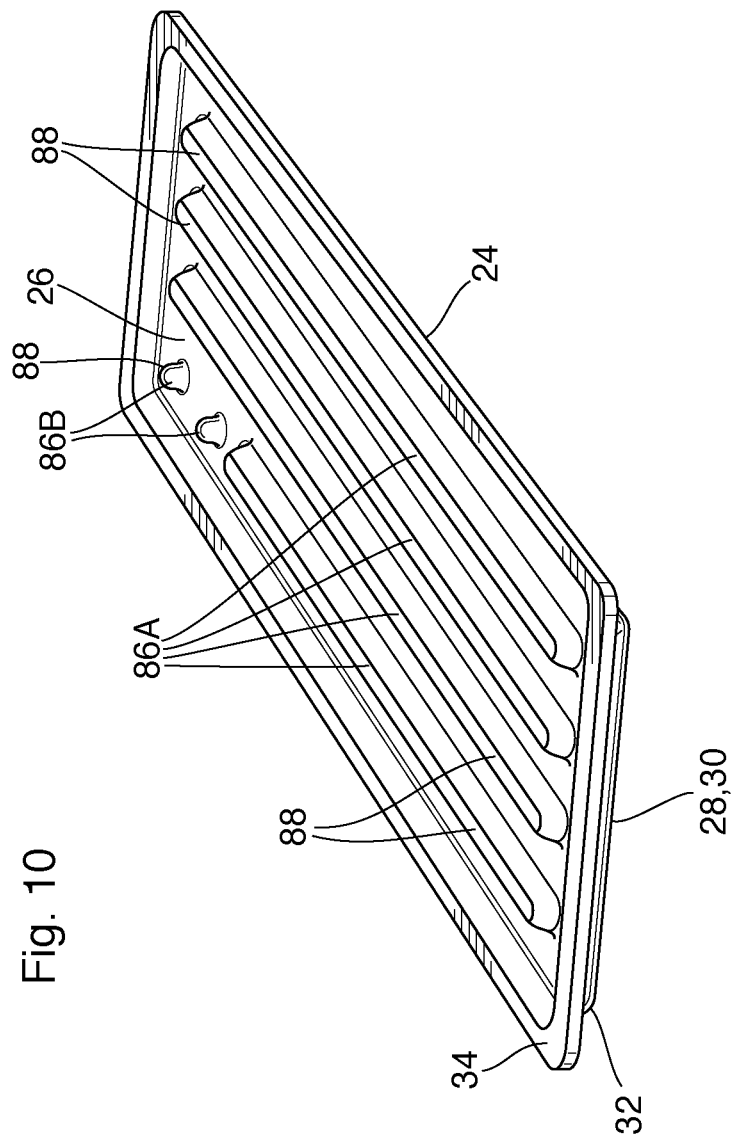
FIG. 10 is a perspective view showing the second plate of the heat exchanger according to the fourth embodiment.

For example, heat exchanger 84 has a similar overall configuration to that of heat exchanger 10, with a flat first plate 18 and a shaped second plate 24. Instead of having a turbulence-enhancing insert 58, heat exchanger 84 has a plurality of protrusions 86 formed in the flat, planar base 30 of the second plate 24, as shown in FIG. 10. The protrusions 86 have the same height as the raised peripheral sidewall 32, and each protrusion 86 has a rounded or flat sealing surface 88 which is co-planar with the planar flange 34 of peripheral sidewall 32. The flat sealing surfaces 88 of the protrusions are in intimate thermal contact with, and optionally metallurgically bonded to, the inner surface 22 of the first plate 18 so as to provide similar heat transfer benefits as the bonding of the turbulence-enhancing inserts 58 to the first plate 18 in heat exchanger 10, as discussed above. In addition to providing increased turbulence and surface area for heat transfer, the protrusions 86 provide structural support for the first and second plates 18, 24, thereby enhancing rigidity of the heat exchanger 10.

The protrusions 86 may have various shapes, when viewed in plan. For example, the protrusions 86 may be elongated in the direction of fluid flow in passage 12, or angled relative to the direction of fluid flow in passage 12. Such elongated protrusions 86 may be straight or curved, and are referred to herein as "ribs", and are identified as 86A in FIG. 10. Where the protrusions are not significantly elongated in any direction they are referred to herein as "dimples", and are identified as 86B in FIG. 10. Whether they are in the form of dimples or ribs, the protrusions 86 assist in directing the fluid flow between the inlet and outlet ports 14, 16, and are located so as to assist in distributing the fluid flow across substantially the entire surface area of the first and second plates 18, 24. It will be appreciated that the pattern of protrusions 86 shown in FIG. 10 is for the purpose of illustration only, and should not be construed as being a preferred pattern of protrusions 86.

An alternate form of heat exchanger 90 incorporating protrusions 86 is now described with reference to FIG. 11. Heat exchanger 90 includes shaped first and second plates 18, 24 which are similar or identical to each other, as in heat exchanger 68 described above. In heat exchanger 90, a plurality of protrusions 86 is formed in the flat, planar base 30' of the first plate 18, and a plurality of protrusions 86 is formed in the flat, planar base 30 of the second plate 24. The protrusions 86 have the same height as the raised peripheral sidewalls 32', 32 of plates 18, 24. In the present embodiment, the protrusions 86 in the first plate 18 are aligned with the protrusions 86 in the second plate 24, such that the sealing surfaces 88' of the protrusions 86 in the first plate 18 are in intimate thermal contact with, and optionally metallurgically bonded to, the sealing surfaces 88 of the corresponding protrusions 86 in the second plate 24, for example by brazing.

Heat exchanger 90 also includes a first electrical heating element 42 which is applied to the outer surface 22 of the first plate 18, in the flat, planar regions which are located between the protrusions 86. Alternatively, as in heat exchanger 76, the heat exchanger 90 may include a heat sink plate 78 having an inner surface 80 which is in intimate thermal contact with, and optionally metallurgically bonded to, the outer surface 22 of the first plate 18, in the flat, planar regions between the protrusions 86, and an outer surface 82 to which the first electrical heating element 42 is applied.

Figure 11:
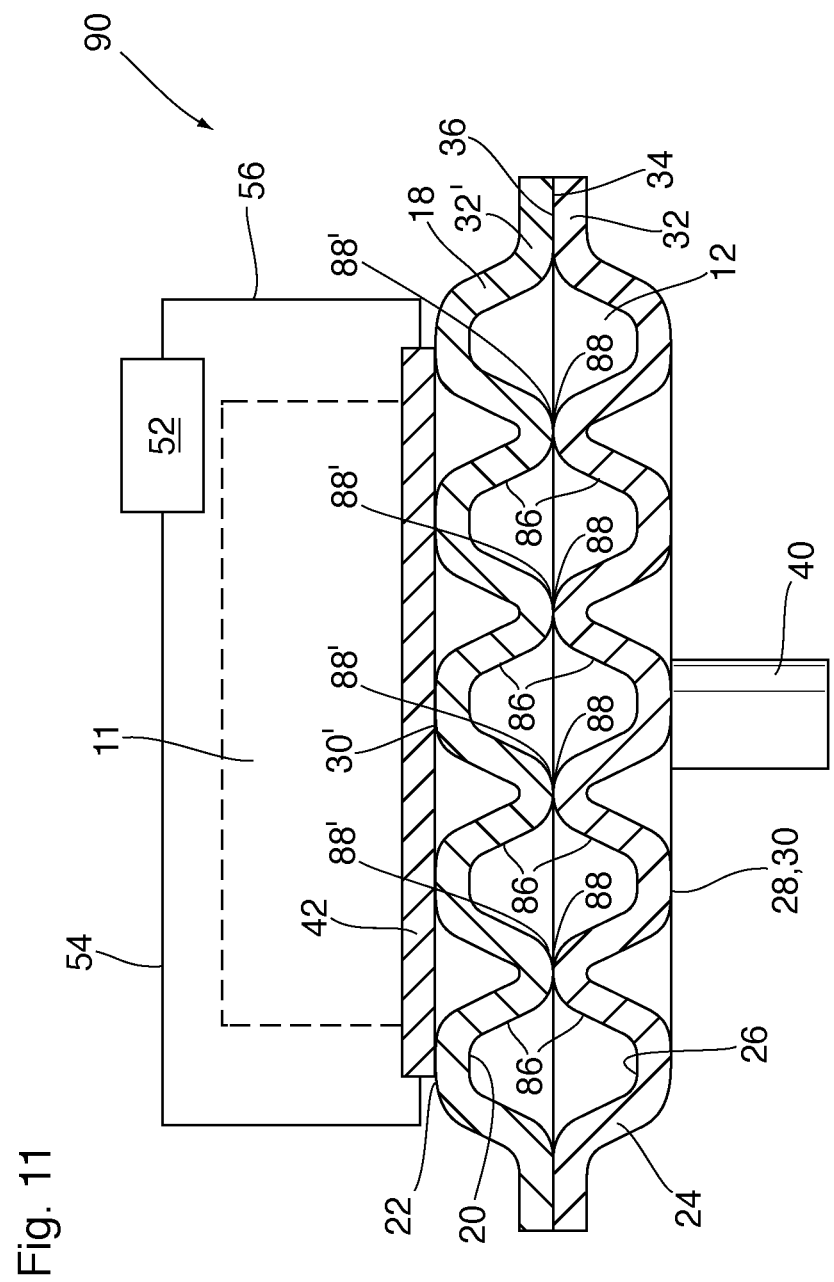
FIG. 11 is a transverse cross-section through a heat exchanger according to a fifth embodiment.

FIGS. 9 and 11 show that heat exchangers 84 and 90 may each have a vehicle component 11 mounted to or in contact with the electrical heating element 42 on its top surface. In heating mode, the electrical heating element 42 is activated to heat the fluid in passage 12 and plates 18, 24, and also to directly heat the vehicle component 11. In cooling mode, a coolant at a lower temperature than the vehicle component 11 is circulated through the fluid flow passage 12 to cool the vehicle component 11.

With the limited exception of heat exchanger 76, all the heat exchangers described above are manufactured by directly applying the electrical heating elements 42 and/or 70 to an otherwise completely assembled heat exchanger. However, such an assembly process may not be ideal as it requires the entire heat exchanger to be subjected to several processing steps after it is otherwise fully assembled, wherein at least some of the additional processing steps involve heating the assembled heat exchanger, for example during application and/or curing of the layers making up the electrical heating element(s) 42 and/or 70.

This issue is addressed by the embodiments of FIGS. 12 to 15, which are now discussed below. Each of these embodiments relates to a heat exchanger which includes a sub-structure, referred to herein as a "heater plate component" 92, comprising: a plate portion 94 having an inner surface 96 and an outer surface 98; a turbulence-enhancing insert 58 having a plurality of its ridges 60 fixed to the inner surface 96 of the plate portion 94; and an electrical heating element 42 adjacent to the outer surface 98 of the plate portion 94 and directly opposed to the turbulence-enhancing insert 58.

FIGS. 12 to 15 show only portions of heat exchangers which incorporate a heater plate component 92. It will be appreciated, however, that the heat exchangers shown in FIGS. 12 to 15 may have any of the configurations of the embodiments described above, and like reference numerals are used in FIGS. 12 to 15 to identify like elements.

Figure 12:
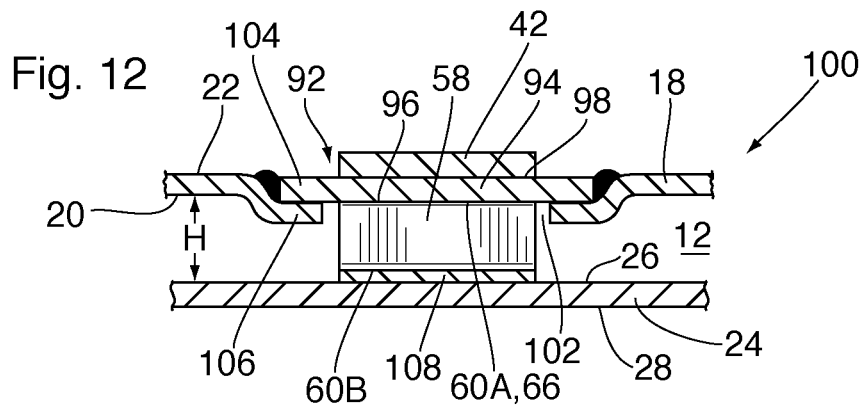
FIG. 12 is a partial, longitudinal cross-section through a heat exchanger according to a sixth embodiment.

FIG. 12 shows a portion of a heat exchanger 100 comprising a first plate 18 and a second plate 24, and which may have any of the configurations described above. In the present embodiment, the first plate 18 has an opening 102 into which the heater plate component 92 is sealingly received. In this regard, the heater plate component 92 has a flat, planar plate portion 94, and the plate portion has a peripheral edge flange 104 extending outwardly beyond the edges of the turbulence-enhancing insert 58 along the inner surface 96, and extending outwardly beyond the edges of the electrical heating element 42 along the outer surface 98. The opening 102 in first plate 18 is sized and shaped to permit the turbulence-enhancing insert 58 to be inserted into the fluid flow passage 12 through the opening 102, but is smaller than the planar plate portion 94. Further, the first plate 18 is formed with a flat, planar sealing flange 106 which extends outwardly from the opening 102 and which is recessed below the outer surface 22 of the first plate 18. The sealing flange 106 is sized and shaped to receive the peripheral edge flange 104 of plate portion 94 in sealed engagement. A fluid-tight, sealed connection between the first plate 18 and plate portion 94 can be provided by any suitable means, including a mechanical seal with or without a gasket between the flanges 104 and 106, or by a metallurgical bond whereby the flanges 104, 106 are joined by brazing or welding.

In heat exchanger 100, the top ridges 60A of the turbulence-enhancing insert 58 are in intimate thermal contact with, and optionally metallurgically bonded to, the inner surface 96 of the plate portion 94, however, the bottom ridges 60B are not metallurgically bonded to inner surface 26 of the second plate 24, and may or may not be in contact with the inner surface 26, so as to provide a thermal conductance gap therebetween.

Since the turbulence-enhancing insert 58 is in intimate thermal contact with an adjacent plate 94 only along its top ridges 60A, it may be susceptible to damage caused by the fluid flowing through the fluid flow passage 12. In order to provide additional support for the turbulence-enhancing insert 58, the heater plate component 92 further comprises a flat support plate 108 which is secured to the bottom ridges 60B of the turbulence-enhancing insert 58 along one of its surfaces, for example by a metallurgical bond produced by brazing or welding. The opposite surface of the flat support plate 108 is located in close proximity to the inner surface 26 of the second plate 24, without being metallurgically bonded thereto, and may or may not be in direct contact with the inner surface 26, so as to provide a thermal conductance gap therebetween. For example, in heat exchanger 100, where the flat, planar sealing flange 106 is recessed by an amount which is equivalent to the thickness of the plate portion 94, the combined height of the turbulence-enhancing insert 58 and the support plate 108 may be the same as the height (H) of the fluid flow passage 12 outside the area of the recessed sealing flange 106.

Figure 13:
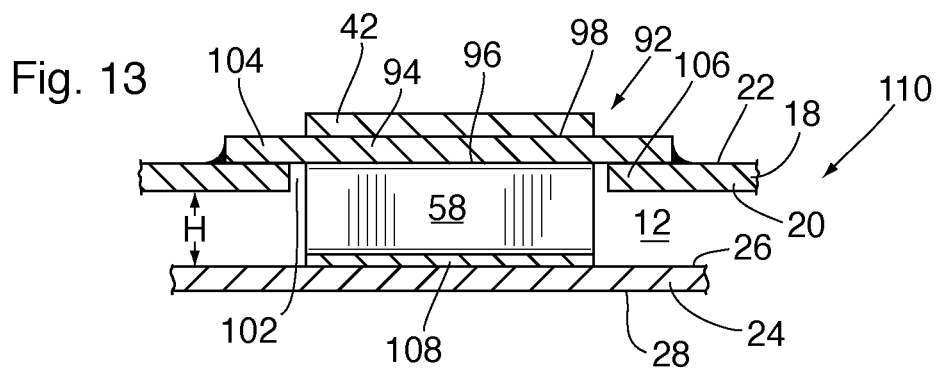
FIG. 13 is a partial, longitudinal cross-section through a heat exchanger according to a seventh embodiment.

It will be seen that the height of the fluid flow passage 12 in heat exchanger 100 is slightly reduced due to the provision of the recessed sealing flange 106 surrounding opening 102 in the first plate 18. FIG. 13 shows an alternate heat exchanger 110 in which this height reduction in fluid flow passage 12 is avoided. In this regard, heat exchanger 110 is identical to heat exchanger 100 except that the flat, planar sealing flange 106 around the opening 102 in first plate 18 is co-planar with the outer surface 22 of first plate 18 (i.e. it is not recessed). Thus, there is no reduction in the height of the fluid flow passage 12. It will be appreciated that the height of the turbulence-enhancing insert 58 and/or the thickness of flat support plate 108 may be increased in heat exchanger 110 due to the increased distance between the inner surface 96 of plate portion 94 and the inner surface 26 of second plate 24, as compared to heat exchanger 100. For example, where the flat support plate 108 has the same thickness as the first plate 18, the height of the turbulence-enhancing insert 58 may be the same as the height (H) of the fluid flow passage 12. A sealed connection between the inner surface 96 of plate portion 94 (in the area of edge flange 104) and the outer surface 22 of first plate 18 is accomplished by a mechanical or metallurgical bond as described above with reference to heat exchanger 100.

Figure 14:
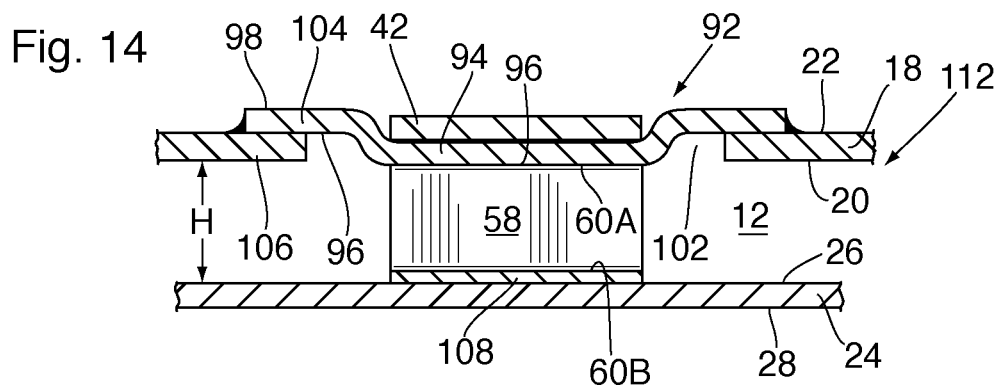
FIG. 14 is a partial, longitudinal cross-section through a heat exchanger according to a eighth embodiment.

FIG. 14 illustrates a heat exchanger 112 according to another embodiment which is similar to heat exchanger 110 in that the flat, planar sealing flange 106 around the opening 102 in first plate 18 is co-planar with the outer surface 22 of first plate. However, rather than being co-planar with the remainder of plate portion 94, the peripheral edge flange 104 is raised relative to the portions of plate portion 94 on which the electrical heating element 42 and the turbulence-enhancing insert are provided. Where the peripheral edge flange 104 is raised by an amount which is equal to the thickness of the first plate 18, the combined height of the turbulence-enhancing insert 58 and the support plate 108 may be the same as the height (H) of the fluid flow passage 12. The edge flange 104 is sealingly connected along inner surface 96 to the flat outer surface 22 of first plate 18, wherein the sealed connection is provided by a mechanical or metallurgical bond as described above with reference to heat exchanger 100.

Figure 15:
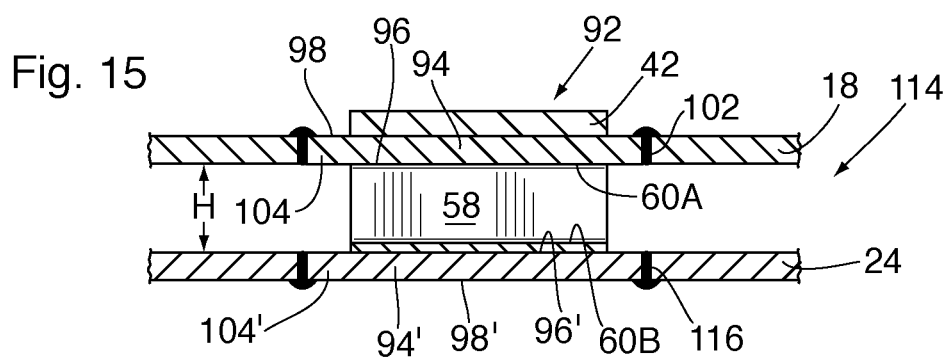
FIG. 15 is a partial, longitudinal cross-section through a heat exchanger according to a ninth embodiment.

FIG. 15 illustrates a heat exchanger 114 in which aligned openings are provided through both the first and second plates 18, 24. In particular, the first plate 18 has an opening 102 which is aligned with an opening 116 in the second plate 24. In this embodiment the heater plate component 92 comprises a turbulence-enhancing insert 58 sandwiched between a first plate portion 94 having an inner surface 96 and an outer surface 98, and a second plate portion 94' having an inner surface 96' and an outer surface 98'. The first and second plate portions 94, 94' are of the same size and shape and are adapted to fit closely inside the inner peripheries of the respective openings 102, 116 in the first and second plates 18, 24. The top ridges 60A of the turbulence-enhancing insert 58 are in intimate thermal contact with, and optionally metallurgically bonded to, the inner surface 96 of first plate portion 94, and the bottom ridges 60B of the turbulence-enhancing insert 58 are in intimate thermal contact with, and optionally metallurgically bonded to, the inner surface 96' of the second plate portion 94'.

The peripheral edge flanges 104, 104' of the plate portions 94, 94' are sealingly connected to the respective first and second plates 18, 24 by mechanical or metallurgical bonding as described above with reference to heat exchanger 100. In the present embodiment the turbulence-enhancing insert has a height which is the same as the height of the fluid flow channel 12, and it can be seen that the provision of the second plate portion 94 eliminates the need for the flat support plate 108 which is present in heat exchangers 100, 110 and 112. As shown, a first electrical heating element 42 may be provided on the outer surface 98 of the first plate portion 94, opposite to the turbulence-enhancing insert 58, and a second electrical heating element 70 may be provided on the outer surface 98' of the second plate portion 94', opposite to the turbulence-enhancing insert 58.

Figure 16:
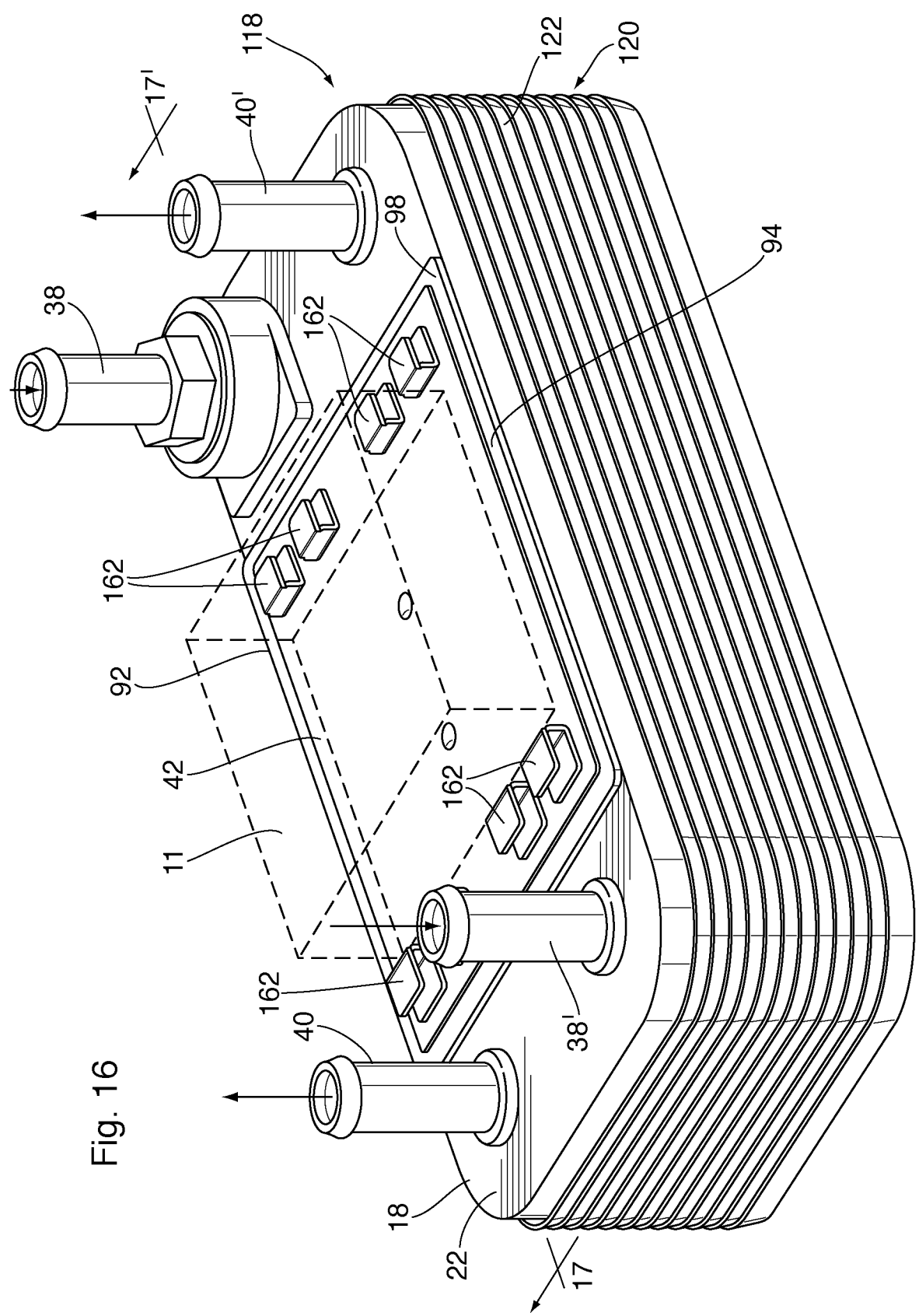
FIG. 16 is a top perspective view of a heat exchanger according to a tenth embodiment.
Figure 17:
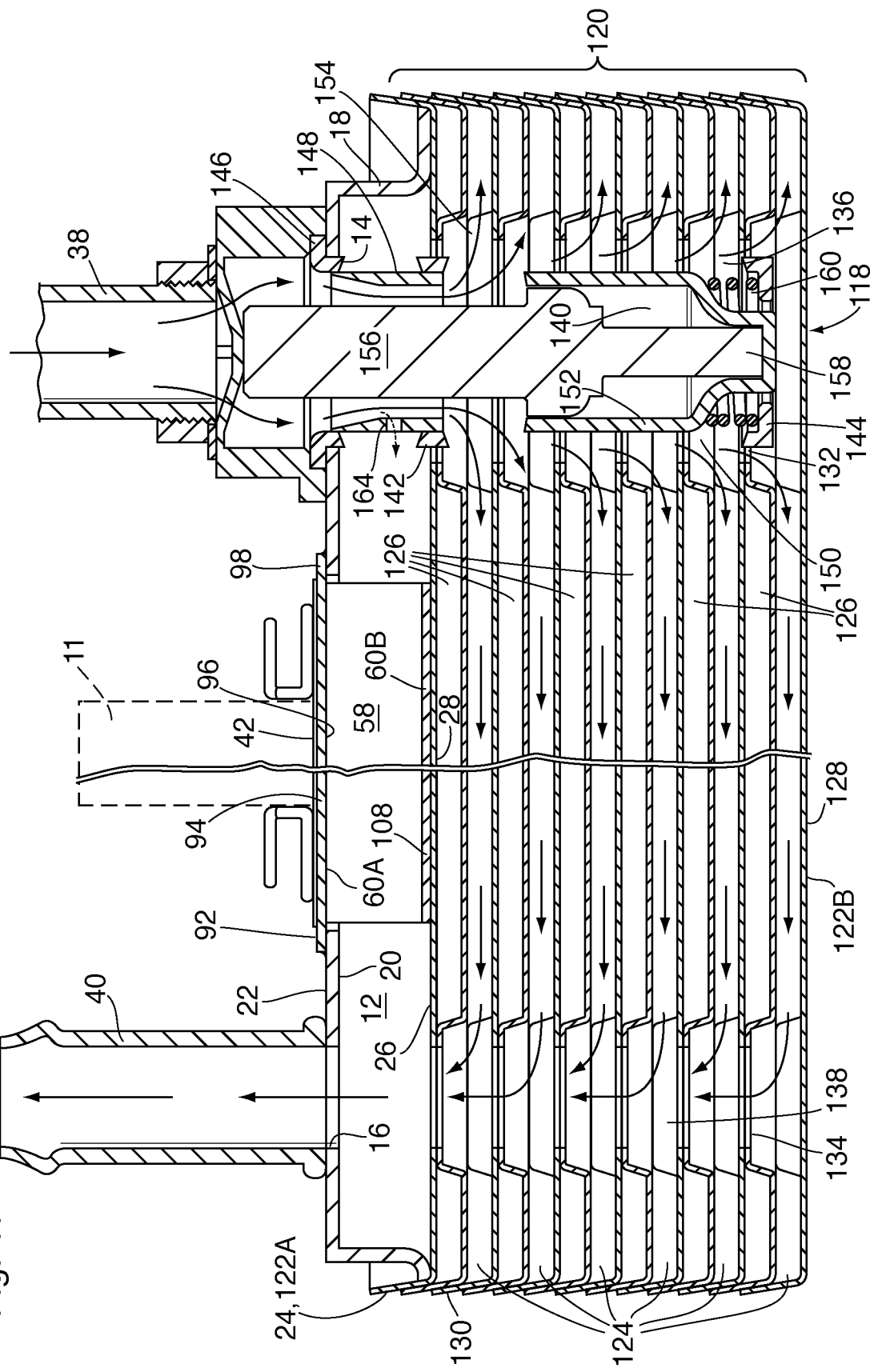
FIG. 17 is a cross-section along line 17-17' of FIG. 16, with the internal bypass valve in an open position.
Figure 18:
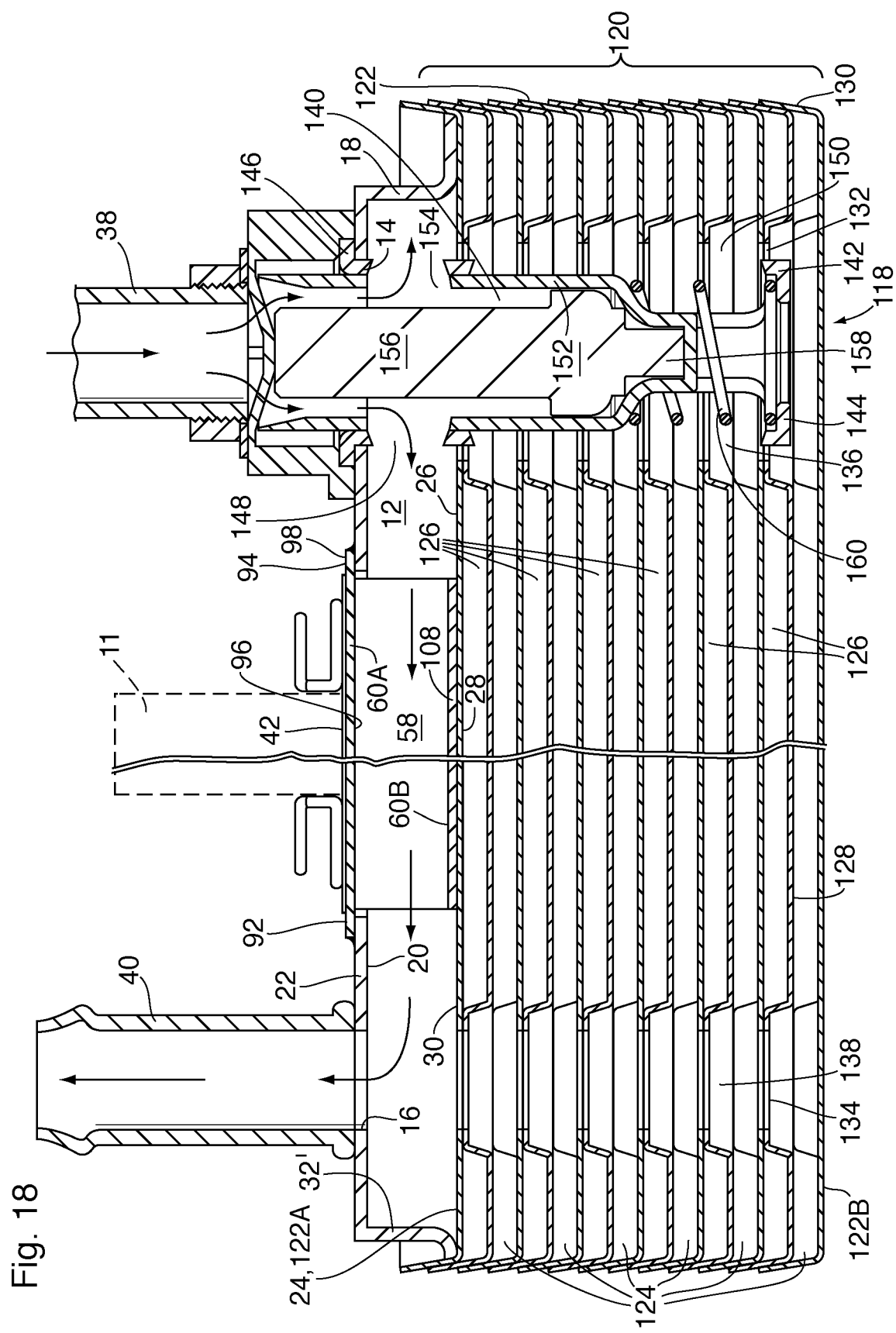
FIG. 18 is a cross-section along line 17-17' of FIG. 16, with the internal bypass valve in a closed position

The above-described embodiments each relate to heat exchangers with integrated electrical heating elements which are constructed from a single pair of plates 18, 24. FIGS. 16-18 illustrate a heat exchanger 118 according to yet another embodiment, which is constructed from a stack of core plates and includes alternating fluid flow passages for two automotive fluids, as well as a heated bypass passage in which one of the automotive fluids may be heated by an integrated electrical heating element.

Heat exchanger 118 may comprise an oil-to-water (OTW) heat exchanger, where one of the automotive fluids is oil, such as engine oil, transmission fluid or axle lubricant, and the other automotive fluid is a water and/or glycol-based heat exchange fluid such as a coolant.

Heat exchanger 118 includes a number of elements which are similar to or the same as the elements of the heat exchangers described above, and like reference numerals are used in FIGS. 16 to 18 to identify like elements. In this regard, heat exchanger 118 includes first fluid inlet port 14 and a first fluid outlet port 16 which are provided in a first plate 18 having an inner surface 20 and an outer surface 22, with corresponding first fluid inlet and outlet fittings 38, 40 being provided on the outer surface 22 of the first plate 18. Because the heat exchanger 118 includes flow passages for two different automotive fluids, heat exchanger 118 also includes a second pair of inlet and outlet fittings 38', 40', these being provided on the top of the heat exchanger 118, i.e. on the outer surface 22 of first plate 18. However, it will be appreciated that in some embodiments some or all of the inlet and outlet ports and/or fittings could instead be provided in the bottom of the heat exchanger 118, as determined by application-specific packaging requirements.

Heat exchanger 118 further comprises a core 120 made up of a plurality of dished heat exchanger core plates 122 to provide a plurality of first fluid flow passages 124 for a first fluid and a plurality of second fluid flow passages 126 for a second fluid, arranged in alternating order throughout the height of the core 120. All the core plates 122 are identical except the top and bottom core plates, which are identified herein with reference numerals 122A and 122B, respectively.

The core plates 122 each have a generally flat base 128 with an upwardly extending, outwardly sloped, peripheral sidewall 130 which is nested and brazed together with sidewalls 130 of adjacent core plates 122 to seal the edges of the first and second fluid flow passages 124, 126. The bases 128 of all the core plates 122 except the bottom core plate 122B include inlet and outlet openings for each of the two fluids, although only one pair of openings 132, 134 is shown in the cross-sectional views of FIGS. 17 and 18. The inlet openings 132 are aligned throughout the height of the core 120 to form first fluid inlet manifold 136, and the outlet openings 134 are aligned throughout the height of the core 120 to form a first fluid outlet manifold 138, wherein the inlet and outlet manifolds 136, 138 are in flow communication with the first fluid inlet and outlet ports 14, 16 and corresponding fittings 38, 40.

The inlet and outlet openings for the second fluid (not shown) similarly form inlet and outlet manifolds (not shown) which are in flow communication with the second fluid inlet and outlet fittings 38' and 40'.

The bottom core plate 122B is free of openings so as to close the bottoms of the manifolds. In the present embodiment the top core plate 122A in the core 118 is analogous to the second plate 24 of the heat exchangers described above, and is therefore identified by reference numeral 24 in the drawings and is sometimes referred to as "second plate 24" in the following description, having an inner surface 26 and an outer surface 28. Both the first plate 18 and second plate 24 in the present embodiment are "shaped plates", wherein the first plate 18 has a base 30' surrounded by a raised peripheral sidewall 32' extending from the base 30' to a planar flange 34' defining a sealing surface which is sealed to the outer periphery of the flat base 128 of second plate 24 (along inner surface 26), inwardly of the peripheral sidewall 130.

Within the core 120 of heat exchanger 118, heat is transferred between the first fluid flowing through first fluid flow passages 124 and the second fluid flowing through second fluid flow passages 126. One of the fluids will be heated and the other will be cooled. The first and second fluids may be different or the same in terms of composition, and it will be appreciated that the fluid flow passages 124, 126 are sealed from one another so that the two fluids do not mix.

Enclosed between the first plate 18 and the second plate 24 is a fluid flow passage 12, also referred to herein as "bypass channel 12", through which the first fluid may flow under certain temperature conditions, further discussed below, passing directly from the first fluid inlet port 14 to the first fluid outlet port 16 and bypassing the first fluid flow passages 124 of the core 120. In the present embodiment the bypass channel 12 is located on the top of the core 120, but it could instead be positioned below the core 120.

Received at least partly inside the first fluid inlet fitting 38 and/or the first fluid inlet manifold 136 is a thermal bypass valve (TBV) 140 having a stationary outer sleeve 142, generally in the form of a cylinder. The outer sleeve 142 has a bottom end 144 and a top end with a lip 146 which is retained in the first fluid inlet port 14, between the first fluid inlet fitting 38 and the outer surface 22 of first plate 18, for affixing the outer sleeve 142 and the TBV 140 in place.

The outer sleeve 142 is provided with one or more upper slots 148 which are in flow communication with bypass channel 12 and one or more lower slots 150 which are in flow communication with the first fluid inlet manifold 136. The upper slots 148 of the outer sleeve 142 permit fluid flow from the first fluid inlet port 14 to the bypass channel 12, while the lower slots 26 permit flow of the first fluid from the first fluid inlet port 14 to the first fluid inlet manifold 136, and from there to the first fluid flow passages 124 of core 120, for heat exchange with the second fluid flowing through the second fluid flow passages 126.

Located inside the outer sleeve 142 of TBV 140 is a slidably movable inner sleeve 152 that can slidably move within the outer sleeve 142 from a first (heat exchange) position shown in FIG. 17 to a second (bypass) position shown in FIG. 18. The inner sleeve 152 has one or more slots 154 which align with the upper slots 148 of outer sleeve 142 in the bypass position shown in FIG. 18.

The TBV also comprises a thermal actuator 156 which may be in the form of a wax motor and which may be rigidly mounted at its upper end to the first fluid inlet fitting 38, such that the actuator 156 is in contact with the first fluid entering the inlet port 14. The interior of the actuator 156 contains a wax which expands when heated, and includes a piston 158 which extends when the wax is heated by the first fluid and retracts when the wax is cooled by the first fluid, the retraction being assisted by a return spring 160 inside the bottom end 144 of the outer sleeve 142.

In the cold or cool bypass position shown in FIG. 18, the piston 158 is retracted and the inner sleeve 152 is biased toward its uppermost position by return spring 160, such that the slots 154 of inner sleeve 152 align with the upper slots 148 of the outer sleeve 142, causing the first fluid entering through inlet port 14 to enter bypass channel 12 and flow toward the outlet port 16. In this position, the TBV 140 blocks the first fluid from entering the first fluid inlet manifold 136.

In the hot or warm heat exchange condition shown in FIG. 17, the thermal actuator 156 is actuated and causes the piston 158 to become extended and push the inner sleeve 152 downwardly against the biasing force of return spring 160. In this position, the wall of inner sleeve 152 blocks the upper slots 148 of outer sleeve 142 to prevent the first fluid from entering the bypass channel 12. However, in this position, the slots 154 of inner sleeve 152 are aligned with the lower slots 150 of the outer sleeve 142, causing the first fluid entering through inlet port 14 to enter the first fluid inlet manifold, and the first fluid flow passages 124.

The heat exchanger 118 also comprises an electrical heating element 42 which is integrated with the first plate 18 to provide rapid heating of the cool or cold first fluid which enters the bypass channel 12 from the inlet port 14. The heating element 42 of heat exchanger 118 is identical to the heating elements 42 described above and will not be further described here.

The electrical heating element 42 of heat exchanger 118 is shown as having a plurality of electrical contacts 162 which are adapted for connection to an electrical power supply (not show) by leads (not shown), as described above. Although not shown, it will be appreciated that electrical contacts 162 may be connected to a conductive layer (not shown) of electrical heating element 42, as described above with reference to conductive layer 50.

In addition, the heat exchanger 118 may comprise a heater plate component 92 as described above, which is integrated into the first plate 18 in the manner described above and illustrated in any one of FIGS. 12-14. In the specific embodiment illustrated in FIGS. 16-18, the heater plate component 92 is integrated into the first plate 18 in the manner shown in FIG. 13.

It will be appreciated that heat transfer between the bypass channel 12 and the immediately adjacent fluid flow passage of the core 120 (which in the present embodiment is a second fluid flow passage 126) is desirably minimized, and therefore the bottom ridges 60B of the turbulence-enhancing insert 58 in heat exchanger 118 are not metallurgically bonded to the second plate 24, and may not be in direct contact with the second plate 24, so as to provide a thermal conductance gap therebetween. Therefore, in heat exchanger 118, the bottom ridges 60B of turbulence-enhancing insert 58 may be metallurgically bonded to a flat support plate 108 as described above in connection with FIGS. 12-14.

Where the first fluid is oil, such as engine oil, transmission fluid or axle lubricant, the heat exchanger 118 provides rapid heating of the oil at cold start-up to its preferred operating temperature range, so as to improve efficiency of the engine (in a HEV), transmission or axle by quickly bringing these components to their normal operating temperatures. Once the oil is sufficiently heated, the TBV 140 closes the bypass channel and causes the oil to be cooled in the core 120 of heat exchanger 118 by heat transfer to a coolant flowing through the core 120. Therefore, the heat exchanger 118 may function as both an oil heater and an oil cooler, depending on whether the heat exchanger 118 is in bypass mode (FIG. 18) or heat exchange mode (FIG. 17).

Where the first fluid is coolant, the heat exchanger 118 provides rapid heating of the coolant at cold start-up to its preferred operating temperature range. The heated coolant can then be circulated to other vehicle components, such as the batteries, the engine (in a HEV), the passenger cabin heating system, and the AWU system. Once the coolant becomes sufficiently heated, the TBV 140 closes the bypass channel and causes the coolant to flow through the core 120 of heat exchanger 118, for example to absorb heat from the oil flowing through core 120. Therefore, the heat exchanger 118 may function as both a coolant heater and an oil cooler, depending on whether the heat exchanger 118 is in bypass mode (FIG. 18) or heat exchange mode (FIG. 17).

Although FIGS. 16-18 show a compact arrangement in which the TBV is primarily mounted inside the inlet manifold 136, it will be appreciated that the TBV can be mounted outside the core 120 of heat exchanger 118.

FIG. 16 shows that heat exchanger 118 may optionally have a vehicle component 11 (shown in dotted lines) mounted to or in contact with the electrical heating element 42 on its top surface. In heating (bypass) mode, wherein the first fluid is directed to bypass channel 12, the electrical heating element 42 is activated to heat the first fluid flowing through bypass channel 12, to heat plates 18, 24, and also to directly heat the vehicle component 11. In cooling (heat exchange) mode, the electrical heating element 42 is deactivated, the first fluid is directed to the first fluid flow passages 124, and a second fluid (coolant) at a lower temperature than the vehicle component 11 (and at a lower temperature than the first fluid) is circulated through the second fluid flow passages 126. In order to effectively cool the vehicle component 11, a portion of the first fluid will also be directed to flow through bypass channel 12. For this purpose, the inner sleeve 152 may be provided with one or more secondary slots 164 (shown in dotted lines in FIG. 17 only), to allow a portion of the first fluid to enter the bypass channel in cooling mode, as indicated by the dotted arrow in FIG. 17. It will be appreciated that secondary slots 164 will not be required in embodiments where there is no vehicle component 11 mounted to or in contact with the electrical heating element 42.

The heat exchangers as described herein can be used to heat and optionally cool a number of components in a vehicle. A typical vehicle will have a plurality of heating/cooling loops which operate at different temperatures and through which different fluids may be circulated. Some exemplary configurations of heating/cooling loops are now described below with reference to FIGS. 19-22.

Figure 19:
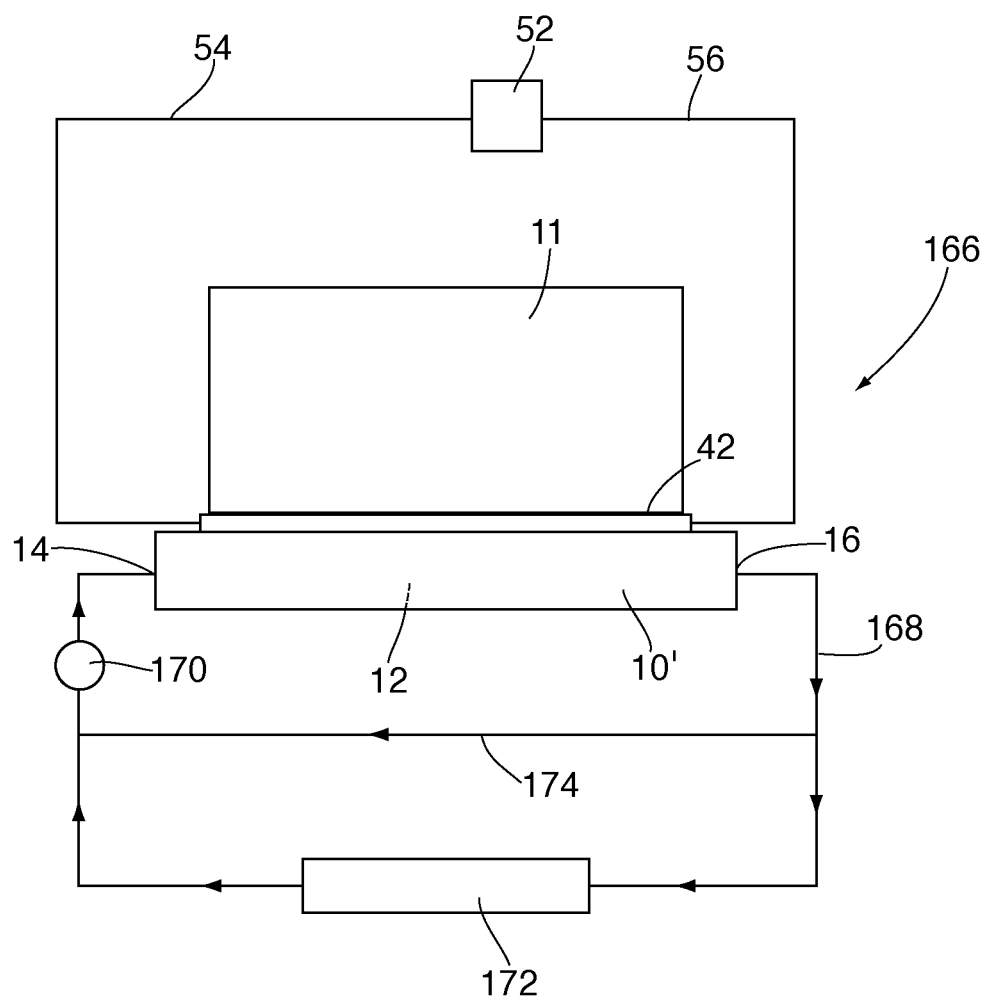
FIG. 19 is a flow diagram of a heating/cooling system of a vehicle according to an eleventh embodiment.

FIG. 19 shows a heating/cooling sub-system 166 according to an embodiment in which a vehicle component 11 is mounted to or in contact with an electrical heating element 42 of a heat exchanger 10' having a fluid flow passage 12, and which may be any of the heat exchangers described herein. The electrical heating element 42 is activated by an electrical power supply 52 to which it is connected by leads 54, 56. Heat exchanger 10' has inlet and outlet ports 14, 16 connected to a fluid circulation loop 168 including a circulation pump 170, a heat exchanger 172, and an optional bypass passage 174 which bypasses the heat exchanger 172.

In some embodiments, the vehicle component 11 may comprise a battery. When it is desired to heat the vehicle component 11, the electrical heating element 42 is activated and receives electrical energy from power supply 52, to directly heat the vehicle component 11 and to heat the heat exchanger 10' and the fluid flowing through fluid flow passage 12 thereof, as previously described above. With the sub-system 166 in this heating mode, the fluid may be caused to flow through bypass passage 174, for example by a thermally or electronically actuated bypass valve (not shown) in sub-system 166.

When it is desired to cool the vehicle component 11, the electrical heating element 42 is de-activated, and heat is transferred to the fluid flowing through fluid flow passage 12 of heat exchanger 10'. In this mode of operation, fluid flow through bypass passage 174 is reduced or stopped, such that some or all of the fluid passes through the heat exchanger 172. In embodiments where the vehicle component 11 is a battery, the temperature of the fluid flowing through fluid circulation loop 168 during cooling mode will typically be at a temperature of about 40° C., and the heat exchanger 172 may comprise a heat exchanger of the vehicle's air conditioning system, such as a chiller, or heat exchanger 172 may comprise a heat exchanger in a mini refrigeration or heat pump system which does not condition air in the vehicle.

Figure 20:
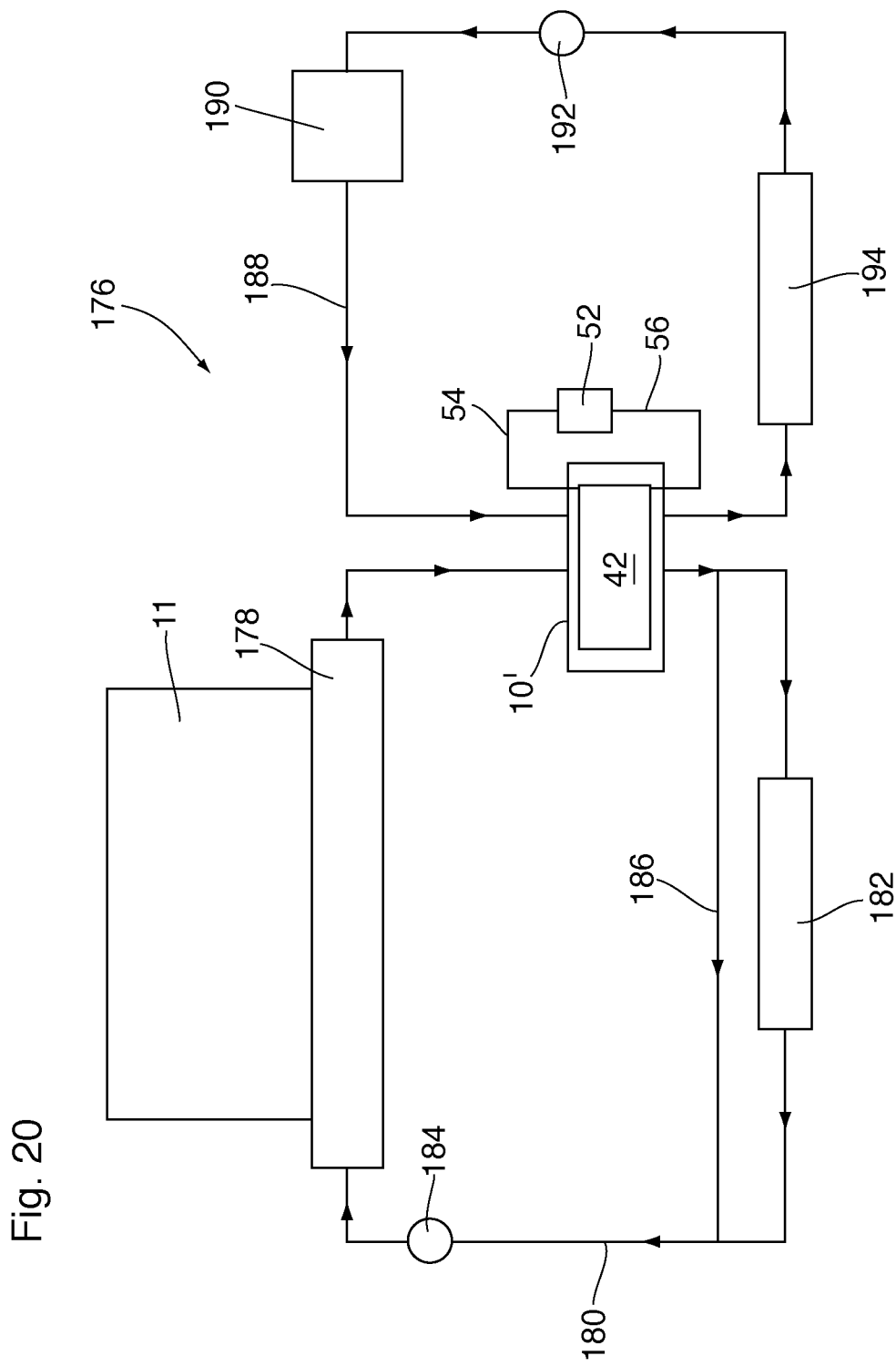
FIG. 20 is a flow diagram of a heating/cooling system of a vehicle according to a twelfth embodiment.

FIG. 20 shows a heating/cooling sub-system 176 according to another embodiment in which a vehicle component 11 is mounted to or in contact with a heat exchanger 178. For example, the vehicle component 11 may be a battery, and the heat exchanger 178 may comprise a battery heat exchanger which may be similar or identical to any of heat exchangers 10, 68, 76, 84, 90, 100, 112, 114 and 118 described above, except that heat exchanger 178 lacks a heating element 42, 70. The sub-system 176 includes a first fluid circulation loop 180 (battery loop) which includes a heat exchanger 182 such as a chiller of an air conditioning system, a circulation pump 184, and a bypass flow passage 186.

The sub-system 176 also includes a second fluid circulation loop 188 through which the same or different heat transfer fluid is circulated at different temperatures, without mixing with the fluid in the first loop 180. For example, the second loop 188 may include one or more vehicle components 190 to be heated and/or cooled other vehicle components, such as the batteries, the engine (in a HEV), the passenger cabin heating system, and the AWU system. The second loop 188 further comprises a fluid circulation pump 192 and a heat exchanger 194 such as a radiator for expelling heat to the surrounding atmosphere.

The sub-system 176 further comprises a heat exchanger 10' provided with an electrical heating element 42 which is connected to an electrical power supply 52 through electrical leads 54, 56. The heat exchanger 10' is adapted to provide heat exchange between the first and second fluids in loops 180, 188, and therefore includes first and second fluid flow passages, as in the heat exchanger 118 of FIGS. 16-18. However, it will be appreciated that heat exchanger 10' does not necessarily include a thermal bypass valve or a bypass channel as described above.

The first and second fluids circulating in the first and second loops 180, 188 may initially be at a low temperature, for example at cold start-up conditions. Under these conditions, the heater 42 will be activated to heat the fluids in both loops 180, 188, due to heat transfer between the first and second fluids as they pass through heat exchanger 10'. During this initial warm-up period, the first fluid may bypass the heat exchanger 182 and flow through bypass flow passage 186.

Once the first and second fluids in loops 180, 188 become adequately heated, the electrical heating element 42 is de-activated. Further, as the first and second fluids reach their normal operating temperatures, which may be different, it may be desirable for the first fluid and/or the second fluid to bypass heat exchanger 10' altogether, and for this purpose the first and/or second loop 180, 188 may be provided with additional bypass passages (not shown).

A vehicle may also include a number of other heating/cooling sub-systems for heating/cooling a number of other vehicle components, as will now be described with reference to FIGS. 21 and 22.

Figure 21:
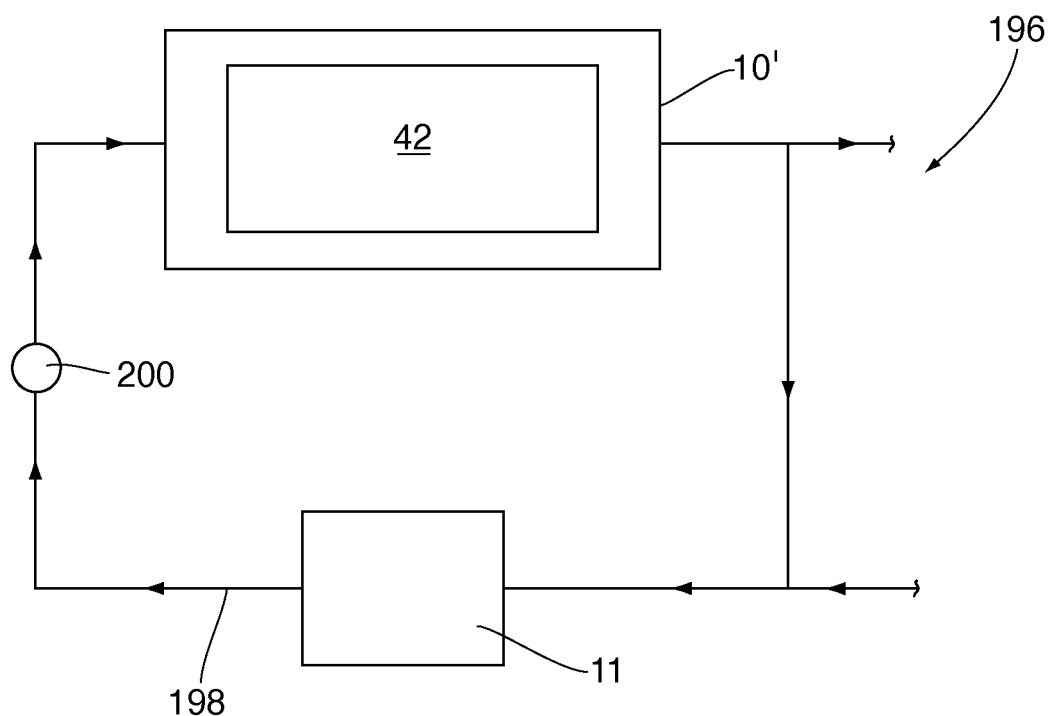
FIG. 21 is a flow diagram of a heating/cooling system of a vehicle according to a thirteenth embodiment.

FIG. 21 shows a heating/cooling sub-system 196 which includes a heat exchanger 10' with an electrical heating element 42, a vehicle component 11, and a fluid circulation loop 198 with a circulation pump 200, wherein the loop 198 circulates a heat transfer fluid through both the heat exchanger 10' and the vehicle component 11. In heating mode, the heating element 42 is activated to heat the heat transfer fluid in heat exchanger 10', which is then circulated to vehicle component 11 and heats component 11. Once the component 11 is adequately heated, the heating element 42 is de-activated and heating is discontinued. Such heating can be applied to vehicle components such as axles, wherein the fluid circulated through the loop 198 is axle fluid.

Figure 22:
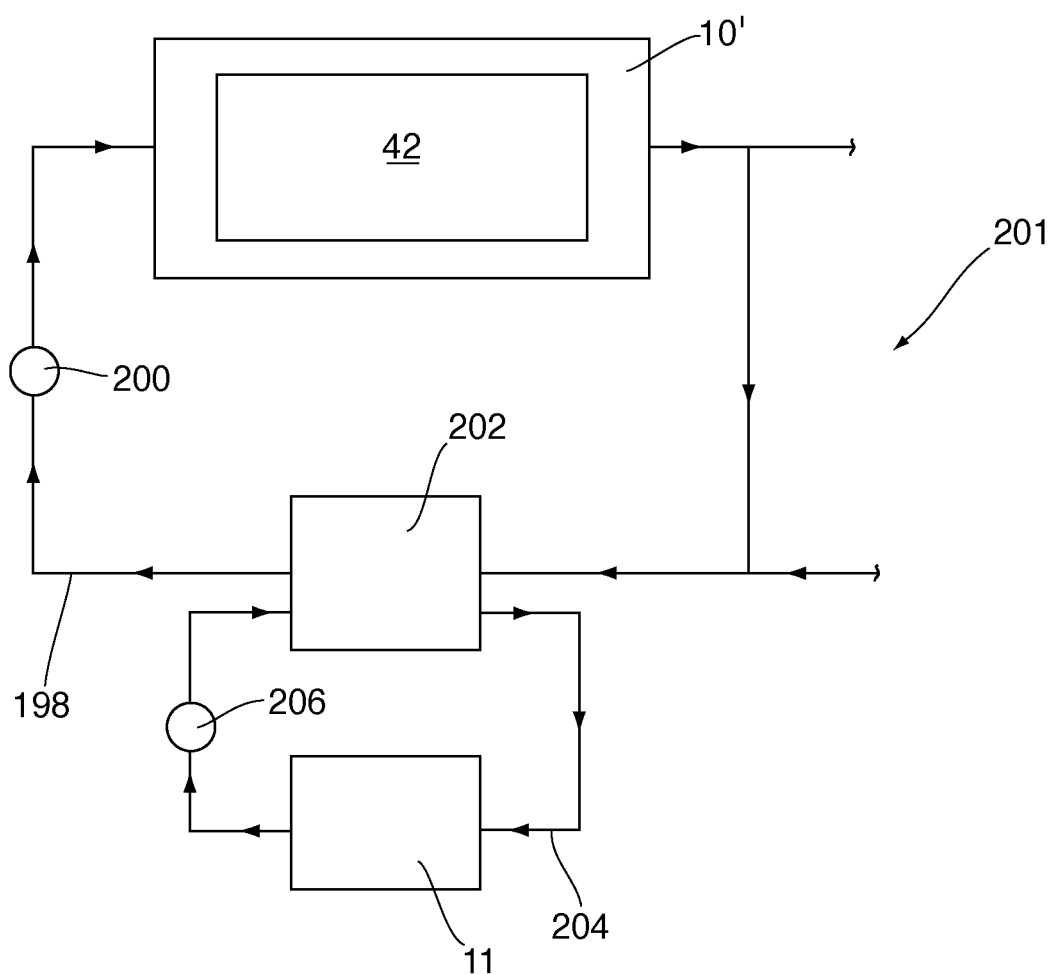
FIG. 22 is a flow diagram of a heating/cooling system of a vehicle according to a fourteenth embodiment.

A heating/cooling sub-system 201 according to another embodiment is shown in FIG. 22. In sub-system 201, the vehicle component 11 is not located in fluid circulation loop 198, but rather an intermediate heat exchanger 202 is provided in loop 198, for transfer of heat to/from a second fluid circulating in a second fluid circulation loop 204 having a circulation pump 204, with vehicle component 11 being provided in second loop 204. In this arrangement, the fluid circulating through first loop 198 may be a coolant and the second fluid in second loop 204 may be oil, such as transmission fluid. A similar arrangement can be used for cabin heating, wherein the intermediate heat exchanger 202 is a heater core through which air is circulated and blown into the passenger cabin.

FIGS. 21 and 22 include broken lines indicating that there may be additional vehicle components and/or heat exchangers (with or without integrated electrical heating elements) in the subsystems 196, 201.

While various embodiments have been described in connection with the present disclosure, it will be understood that certain adaptations and modifications of the described exemplary embodiments can be made as construed within the scope of the present disclosure. Therefore, the above discussed embodiments are considered to be illustrative and not restrictive.

What is claimed is:
1. A heat exchanger, comprising:
(a) a fluid flow passage adapted for flow of a fluid, the fluid flow passage having an inlet and an outlet;
(b) a first plate and a second plate in opposed facing relation to one another, wherein each of the first plate and the second plate are thermally conductive, have an inner surface facing inwardly toward the fluid flow passage and an outer surface facing outwardly from the fluid flow passage, wherein the fluid flow passage is defined by a space between the inner surface of the first plate and the inner surface of the second plate;
(c) a first electrical heating element located outside the fluid flow passage and adjacent to the outer surface of the first plate, such that heat produced by the first electrical heating element is transferred through the first plate to the fluid in the fluid flow passage during use of the heat exchanger;
wherein the first electrical heating element has a thickness between 1 μm and about 1000 μm;
wherein the first electrical heating element comprises an electrically insulating dielectric base layer which is closest to the outer surface of the first plate, and an electrically resistive heater layer on the dielectric base layer; and (d) a heat sink plate having an inner surface which is fixed to the outer surface of the first plate by a metallurgical bond, and an outer surface to which the first electrical heating element is applied with the electrically insulating dielectric base layer of the first electrical heating element in contact with and thermally bonded to the outer surface of the heat sink plate;

wherein the heat sink plate is thicker than either of the first plate and the second plate; and wherein the electrically insulating dielectric base layer comprises thermally conductive, electrically insulating composite layer comprising a polymer mixed with a particulate filler material.

2. The heat exchanger of claim 1, wherein the dielectric base layer is in contact with and thermally bonded to the outer surface of the first plate.

3. The heat exchanger of claim 1, wherein at least one of the first plate and the second plate comprises a shaped plate having a substantially flat, planar base surrounded on all sides by a raised peripheral sidewall extending from the base to a planar flange defining a sealing surface along which the planar flange is sealingly secured to the opposing one of the first plate and the second plate.

4. The heat exchanger of claim 1, wherein the first electrical heating element further comprises an electrically conductive layer in contact with the resistive heater layer;

wherein the conductive layer comprises one or more conductive strips or buss bars which are adapted to be connected to an electrical power supply; and wherein the first electrical heating element further comprises an electrically insulating dielectric top layer provided on the resistive heater layer.

5. The heat exchanger of claim 1, further comprising a turbulence-enhancing insert comprising a corrugated fin or a turbulizer having ridges connected by side walls, wherein a first plurality of said ridges is in contact with the inner surface of the first plate, and wherein the first plurality of said ridges is in thermal contact with the inner surface of the first plate, wherein the turbulence-enhancing insert further comprises a second plurality of said ridges which is in contact with the inner surface of the second plate but is not metallurgically bonded thereto, so as to provide a thermal conductance gap therebetween.

6. The heat exchanger of claim 1, further comprising:

a second electrical heating element provided outside the fluid flow passage and located adjacent to the outer surface of the second plate, such that heat produced by the second electrical heating element is transferred through the second plate to the fluid in the fluid flow passage during use of the heat exchanger;

wherein the second electrical heating element has a thickness from about 1 µm to about 1000 µm;

wherein the second electrical heating element comprises an electrically insulating dielectric base layer which is closest to the outer surface of the second plate, and an electrically resistive heater layer on the dielectric base layer; and wherein the dielectric base layer comprises a thermally conductive, electrically insulating composite layer comprising a polymer mixed with a particulate filler material.

7. The heat exchanger of claim 1, wherein the second plate comprises a shaped plate having a generally flat, planar base surrounded on all sides by a raised peripheral sidewall extending from the base to a planar flange defining a first sealing surface along which the raised peripheral sidewall is sealingly secured to the opposing one of the first plate and the second plate;

wherein the second plate has a plurality of protrusions formed in the flat, planar base thereof, the protrusions having a height which is the same as a height of the planar flange, each said protrusion having a second sealing surface which is co-planar with the first sealing surface of the planar flange;

wherein the second sealing surfaces of the protrusions are in thermal contact with the inner surface of the first plate; and wherein the protrusions comprise ribs and/or dimples.

8. The heat exchanger of claim 1, wherein the outer surface of the first plate is substantially flat;

wherein the first electrical heating element is in contact with a substantially flat portion of the outer surface of the first plate;

wherein the first electrical heating element is adapted for contact with and support of a vehicle component; and wherein the vehicle component comprises at least one battery cell and/or battery module of a rechargeable vehicle battery.

9. The heat exchanger of claim 1, wherein the outer surface of the second plate is substantially flat;

wherein the outer surface of the second plate is adapted for contact with and support of a vehicle component; and wherein the vehicle component comprises at least one battery cell and/or battery module of a rechargeable vehicle battery.

10. The heat exchanger according to claim 1, wherein the heat exchanger comprises a fluid heater for indirect heating of one or more vehicle components which are remote from heat exchanger.

11. The heat exchanger according to claim 1, wherein at least one of the first electrical heating element and the second electrical heating element has a flat outer surface adapted for thermal contact with one or more vehicle components, for direct heating of the one or more vehicle components.

12. The heat exchanger according to claim 11, wherein the flat outer surface of at least one of the first electrical heating element and the second electrical heating element is adapted to support said one or more vehicle components; and wherein said one or more vehicle components comprise one or more battery cells or battery modules of a rechargeable lithium-ion battery for a vehicle.

13. A heat exchanger, comprising:

(a) a fluid flow passage adapted for flow of a fluid, the fluid flow passage having an inlet and an outlet;

(b) a first plate and a second plate in opposed facing relation to one another, wherein each of the first plate and the second plate are thermally conductive, have an inner surface facing inwardly toward the fluid flow passage and an outer surface facing outwardly from the fluid flow passage, wherein the fluid flow passage is defined by a space between the inner surface of the first plate and the inner surface of the second plate; and (c) a first electrical heating element located outside the fluid flow passage and adjacent to the outer surface of the first plate, such that heat produced by the first electrical heating element is transferred through the first plate to the fluid in the fluid flow passage during use of the heat exchanger;

wherein the first electrical heating element has a thickness between 1 μm and about 1000 μm;
wherein the first electrical heating element comprises an electrically insulating dielectric base layer which is closest to the outer surface of the first plate, and an electrically resistive heater layer on the dielectric base layer;
wherein the electrically insulating dielectric base layer comprises a thermally conductive, electrically insulating composite layer comprising a polymer mixed with a particulate filler material;
wherein the first plate has an opening into which a heater plate component is sealingly received, the heater plate component comprising:
 a first plate portion having an inner surface and an outer surface;
 a turbulence-enhancing insert comprising a corrugated fin or a turbulizer having ridges connected by side walls, wherein a first plurality of said ridges is in thermal contact with the inner surface of the first plate portion; and
 said first electrical heating element, being in contact with and adhered to the outer surface of the first plate portion, and being opposed to the turbulence-enhancing insert;
wherein the first plate portion has a peripheral edge flange extending outwardly beyond edges of the turbulence-enhancing insert along its said inner surface, and extending outwardly beyond edges of the electrical heating element along its said outer surface; and
wherein the peripheral edge flange of the first plate portion is connected to the first plate with a fluid-tight, sealed connection, and such that the opening in the first plate is sealed by the peripheral edge flange of the first plate portion.

14. The heat exchanger of claim 13, wherein the heater plate component further comprises a flat support plate which is secured to a second plurality of said ridges of the turbulence-enhancing insert, and wherein the flat support plate is in contact with the inner surface of the second plate.

15. The heat exchanger of claim 13, wherein the second plate has an opening which is aligned with the opening in the first plate;
wherein the heater plate component further comprises a second plate portion having an inner surface and an outer surface, wherein the turbulence-enhancing insert is sandwiched between the first plate portion and the second plate portion, with a second plurality of said ridges in thermal contact with the inner surface of the second plate portion;
wherein the second plate portion has a peripheral edge flange extending outwardly beyond edges of the turbulence-enhancing insert along its said inner surface; and
wherein the peripheral edge flange of the second plate portion is connected to the second plate with a fluid-tight, sealed connection, and such that the opening in the second plate is sealed by the peripheral edge flange of the second plate portion.

16. The heat exchanger of claim 15, further comprising a second electrical heating element provided outside the fluid flow passage, being in contact with and adhered to the outer surface of the second plate portion, and being opposed to a turbulence-enhancing insert.

17. A heat exchanger, comprising:
(a) a fluid flow passage adapted for flow of a fluid, the fluid flow passage having an inlet and an outlet;
(b) a first plate and a second plate in opposed facing relation to one another, wherein each of the first plate and the second plate are thermally conductive, have an inner surface facing inwardly toward the fluid flow passage and an outer surface facing outwardly from the fluid flow passage, wherein the fluid flow passage is defined by a space between the inner surface of the first plate and the inner surface of the second plate;
(c) a first electrical heating element located outside the fluid flow passage and adjacent to the outer surface of the first plate, such that heat produced by the first electrical heating element is transferred through the first plate to the fluid in the fluid flow passage during use of the heat exchanger;
(d) a core comprising a plurality heat exchanger core plates and defining a plurality of first fluid flow passages and a plurality of second fluid flow passages, arranged in alternating order throughout the core;
 wherein the first electrical heating element has a thickness between 1 μm and about 1000 μm;
 wherein the first electrical heating element comprises an electrically insulating dielectric base layer which is closest to the outer surface of the first plate, and an electrically resistive heater layer on the dielectric base layer;
 wherein the electrically insulating dielectric base layer comprises a thermally conductive, electrically insulating composite layer comprising a polymer mixed with a particulate filler material;
 wherein the core includes a first fluid inlet manifold and a first fluid outlet manifold in flow communication with the plurality of first fluid flow passages and a second fluid inlet manifold and a second fluid outlet manifold in flow communication with the plurality of second fluid flow passages;
 wherein the first plate of the heat exchanger includes said inlet and said outlet of the fluid flow passage, and
 wherein the second plate of the heat exchanger is provided with a first fluid inlet manifold opening which is in flow communication with the first fluid inlet manifold and a first fluid outlet manifold opening which is in flow communication with the first fluid outlet manifold; and
(e) a thermal bypass valve arranged to selectively:
 permit flow of the first fluid from the inlet to the fluid flow passage, while blocking flow of the first fluid from the inlet to the first fluid inlet manifold; and
 at least partly block flow of the first fluid from the inlet to the fluid flow passage, while permitting flow of the first fluid from the inlet to the first fluid inlet manifold.

18. A heating/cooling system for a battery electric vehicle (BEV) or hybrid electric vehicle (HEV), the system comprising a first heating/cooling loop and a second heating/cooling loop, wherein each said heating/cooling loop comprises a vehicle component, a heat exchanger for at least heating and optionally cooling the vehicle component, a fluid flow conduit, and a circulation pump;
wherein the heat exchanger comprises:
(a) a fluid flow passage adapted for flow of a fluid, the fluid flow passage having an inlet and an outlet;
(b) a first plate and a second plate in opposed facing relation to one another, wherein each of the first plate and the second plate are thermally conductive, have an inner surface facing inwardly toward the fluid flow passage and an outer surface facing outwardly from the fluid flow passage, wherein the fluid flow passage is defined by a space between the inner surface of the first plate and the inner surface of the second plate; and (c) a first electrical heating element located outside the fluid flow passage and adjacent to the outer surface of the first plate, such that heat produced by the first electrical heating element is transferred through the first plate to the fluid in the fluid flow passage during use of the heat exchanger;

wherein the first electrical heating element has a thickness between 1 µm and about 1000 µm;

wherein the first electrical heating element comprises an electrically insulating dielectric base layer which is closest to the outer surface of the first plate, and an electrically resistive heater layer on the dielectric base layer;

wherein the electrically insulating dielectric base layer comprises a thermally conductive, electrically insulating composite layer comprising a polymer mixed with a particulate filler material;

wherein the first heating/cooling loop comprises:

(a) a first vehicle component comprising a rechargeable battery for powering an electric drive motor of the vehicle;

(b) a first heat exchanger comprising the heat exchanger which includes at least one of said electrical heating elements, one or more first fluid flow passages for a first heat transfer fluid circulating through said first heating/cooling loop, and a first inlet and a first outlet for the one or more first fluid flow passages;

(c) a second heat exchanger for cooling the first heat transfer fluid;

(d) a first circulation pump for circulating the first heat transfer fluid through the first heating/cooling loop; and (e) a first conduit for circulating the first heat transfer fluid throughout the first heating/cooling loop; and wherein the second heating/cooling loop comprises:

(a) a second vehicle component comprising one or more heat-generating electronic components of the HEV/BEV;

(b) said first heat exchanger, wherein the first heat exchanger further includes one or more second fluid flow passages for a second heat transfer fluid circulating through said second heating/cooling loop, and a second inlet and a second outlet for the one or more second fluid flow passages, wherein the one or more first fluid flow passages and the one or more second fluid flow passages are arranged to permit heat transfer between the first heat transfer fluid and the second heat transfer fluid, and to provide heating of the first heat transfer fluid and the second heat transfer fluid by the at least one electrical heating element;

(c) a third heat exchanger for cooling the second heat transfer fluid;

(d) a second circulation pump for circulating the second heat transfer fluid through the second heating/cooling loop; and (e) a second conduit for circulating the second heat transfer fluid throughout the second heating/cooling loop.

* * * * *